Jan. 5, 1937. H. W. WILLIAMS ET AL 2,066,921
ELEVATOR CONTROL SYSTEM
Filed Jan. 31, 1935 18 Sheets-Sheet 1

WITNESSES:

INVENTORS
Harold W. Williams,
Charles F. Carney
and Richard W. Jones.
BY
ATTORNEY Legend:—Brushes shown in position occupied while car is in notching zone of third floor. At each notching point each brush moves to a corresponding position with respect to succeeding brush in direction of travel of the car.

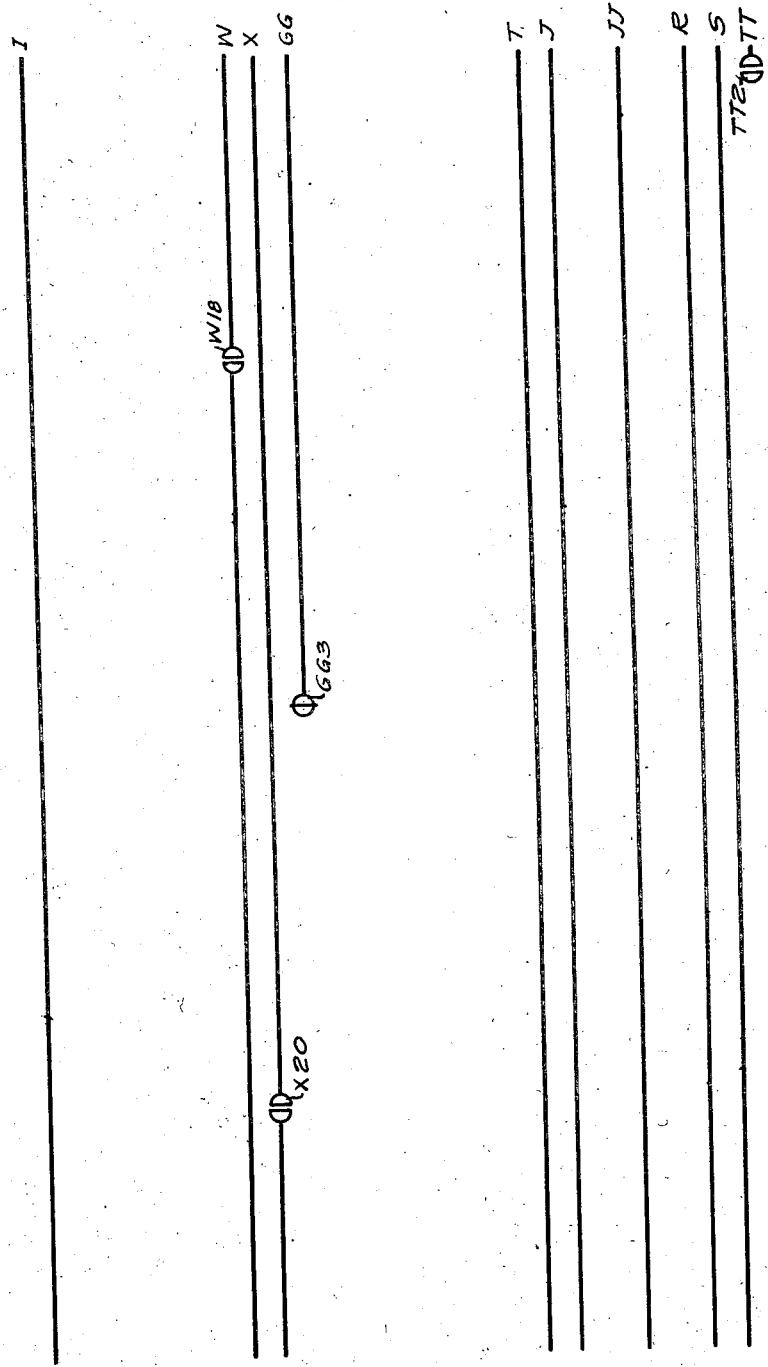

Jan. 5, 1937.  H. W. WILLIAMS ET AL  2,066,921
ELEVATOR CONTROL SYSTEM
Filed Jan. 31, 1935  18 Sheets-Sheet 17

WITNESSES:

INVENTORS
Harold W. Williams,
Charles F. Carney
and Richard W. Jones.
BY
ATTORNEY Patented Jan. 5, 1937

2,066,921

UNITED STATES PATENT OFFICE 2,066,921

ELEVATOR CONTROL SYSTEM

Harold W. Williams, Charles F. Carney, and Richard W. Jones, Chicago, Ill., assignors to Westinghouse Electric Elevator Company, Chicago, Ill., a corporation of Illinois Application January 31, 1935, Serial No. 4,282

27 Claims. (Cl. 187—29)

The present invention relates to systems of control for electric elevators and particularly to such systems in which a plurality of cars are operated together as a bank.

The present invention is of the general type in which the stopping of the cars of the bank is controlled by passenger operated push buttons located at the various floor landings and in which an intending passenger is given an indication at the time he registers a call as to which car of the bank is nearest his floor and in condition to be stopped. Representative systems of this same general character are also disclosed in the copending applications of Bouton, et al., Serial No. 688,784, filed September 9, 1933; of Bouton, et al., Serial No. 736,672, filed July 24, 1934; of Eames, Serial No. 700,257, filed November 29, 1933; of Jones, Serial No. 754,987, filed November 27, 1934; and of Eames, Serial No. 755,578, filed December 1, 1934, all of which are assigned to the Westinghouse Electric Elevator Company.

In the first of the above-identified applications, each car of the bank is provided with individual up and down push buttons at the various floor landings, and signalling devices are provided to inform intending passengers which car of the bank is nearest and in condition to respond to the call. This indication serves to inform an intending passenger which button to operate, after which he is enabled to proceed directly to the hatchway entrance corresponding to the indicated car.

In the last three of the above-identified applications, the push buttons at the various floor landings may be selectively associated with any of the cars of the bank, depending upon the relative positions of the cars with respect to a floor at any given time, and depending further upon whether a particular car is in condition to receive a call at such given time. In these systems, operation of any push button registers a call on the car which at that time is the nearest and in condition to receive a call. The registration of the call immediately produces a signal informing the intending passenger which car will respond to his call.

The present invention embodies features of operation and details of structure which are of value in connection with either of the above two classes of systems, as well as in connection with elevator systems generally, as will become more apparent in the course of the following description.

In the illustrated embodiment of the present invention, each car of the bank is provided with a push button station comprising one up button and one down button, located at each floor served by that car. The push button stations may be located adjacent the respective hatchway entrances but preferably all of the push button stations for a particular floor are collected in a panel and located at a central point at that floor.

An indicating device, comprising lamps for each car, is provided to indicate to intending passengers which car of the bank is nearest the corresponding floor and in condition to receive a call. The lamps are controlled in accordance with the relative positions and directions of travel of the several cars and are disposed to provide a continuous indication.

Operation of the indicated push button at any floor landing registers a call for the corresponding floor and direction on the associated car and also immediately lights a floor lantern for such car and floor. The floor lantern informs the intending passenger that his call has been registered, and, being preferably located adjacent the associated hatchway entrance, enables the intending passenger to proceed directly to such entrance.

Unless a call so registered is transferred to another of the cars, or cancelled, as hereinafter described, it causes the corresponding car to stop at the corresponding floor upon its approach from the corresponding direction, and maintains the floor lantern illuminated until the departure of the car from such floor.

It has been found in practice that intending passengers from time to time operate a push button at a landing other than the push button corresponding to the nearest car. In accordance with the present invention, such operation is effective to register a call on the corresponding car which, unless cancelled or transferred as hereinafter described, causes that car to stop upon its approach in the corresponding direction. The system is arranged, however, so that such operation does not cause an immediate operation of the floor signal, and thus misinform other intending passengers.

Each car of the bank is also preferably provided with a set of car buttons, comprising one button for each floor located within it and effective upon operation to stop the associated car at the corresponding floor. In accordance with the illustrated embodiment, the previously mentioned floor signals are illuminated when a corresponding car stops at a floor, in response to operation of one of its car buttons as well as when it stops in response to operation of a corresponding call button.

It has been found in practice that when any car of the bank stops at a floor, all intending passengers at that floor who wish to travel in the indicated direction will ordinarily board that car although they may have registered their calls on other cars of the bank. For this reason, the present invention comprises an arrangement whereby the stopping of any car of a bank at a floor cancels all calls registered for that floor and direction, thereby preventing subsequent unnecessary stops of other cars of the bank.

In the operation of systems of the general character to which the present invention relates, it happens from time to time that calls registered on one car should be transferred to another car. This may occur because the car upon which the calls are originally registered becomes fully loaded and cannot accommodate additional passengers. In systems in which it is intended that the cars shall travel in a certain rotation or with a certain spacing between cars also, it may occur because a leading car tends to fall behind its schedule or a following car tends to get ahead of its schedule. The present invention comprises mechanism for transferring calls between the several cars to accommodate both of the above two mentioned operating conditions.

During the rush periods of the day when traffic is sufficiently heavy to require bypassing or transferring operations, the majority of stops made during down travel of the cars are in response to hall calls to receive passengers. It frequently happens that a car becomes fully loaded after only one or two stops, and accordingly bypassing operations are frequently required during downward travel. During upward travel of the cars, however, the majority of stops are in response to car calls, to discharge passengers, and bypassing operations are infrequently required even during rush periods. Accordingly, the present invention is arranged so that the mechanism for transferring calls from a leading car to an overtaking car functions during downward travel of the cars, but does not function during upward travel of the cars.

It has been found in practice that the tendency of the cars to depart from a normal spacing occurs more frequently during travel in the down direction than during travel in the up direction. As mentioned, during downward travel of the cars, the principal stops are made to receive passengers, and it is more difficult, under these conditions, to maintain proper spacing of the cars. During upward travel, however, the loading of the cars at the time they leave the terminal is more or less uniform, and the required stops of each car are more or less evenly distributed. For this reason, less difficulty is encountered in maintaining proper spacing. Since the transfer of calls from one car to another results in a transfer of lanterns, causing passengers who have positioned themselves in front of one elevator entrance to proceed to another elevator entrance, it is desirable to introduce such transfers only when necessary. For this reason, the present invention is arranged so that the mechanism for transferring calls from a leading car to an overtaking car functions during downward travel of the cars but does not function during upward travel of the cars. The system is arranged, however, so that if, during upward travel, a car too closely approaches a leading car, the following car is excluded from the signalling system.

To enable a car to transfer calls registered upon it to a following car, because loaded or for other reason, each car of the bank is provided with a "by-pass" push button individual to each other car of the bank. Appropriate signalling means are provided in each car to inform the attendants thereof which car of the bank is nearest his car at any particular time. Operation of the corresponding bypass-button transfers all unanswered hall calls registered upon the bypassing car from the bypassing car to such next car. The bypassed calls immediately light the corresponding floor lanterns for such next car and cause the stopping thereof at the corresponding floors. The corresponding floor lanterns for the transferring car are extinguished. The arrangement is preferably such that as long as a bypass-button is held closed, the bypassing car by-passes any calls registered on its car buttons, as well as transferring the hall calls registered upon it. Upon release of the bypass-button, the bypassing car is again effective to respond to any calls registered upon its car buttons, as well as to any calls subsequently registered on its hall buttons. As mentioned, this apparatus functions only during down travel of the cars.

To enable the transfer of calls from one car to another in the event that one car overtakes another, travelling in the same direction, each car of the bank is provided with a transfer push button and a transfer light. In the event a car approaches within a predetermined distance of another, the transfer light is lighted, informing the operator of the overtaking car that a transfer operation should occur. Operation of the transfer push button transfers all calls registered on the leading car to the overtaking car. The transferred calls light the corresponding floor lanterns for the overtaking car and as an incident to the transfer operation, the corresponding floor lanterns for the leading car are extinguished. In the illustrated embodiment, as in the case of the previously described transfer operation, a complete transfer operation involves both closure and release of the transfer button. The registered hall calls are transferred to the overtaking car upon closure of the button, but the cancelling of these calls from the leading car does not occur until the button is released. This sequence of operation insures the completion of registration of calls on one car prior to the cancellation of such calls from the other car.

The transfer light may be arranged to be lighted when the overtaking car is at any desired distance behind the leading car. In the illustrated embodiment, this distance is three floors. It may happen from time to time that a call is registered on the overtaking car for one or more of these intervening floors. In this event it is desirable that the transfer signal be withheld as it may be expected that by the time the overtaking car has responded to such intervening call or calls, the leading car may have advanced sufficiently far to make a transfer operation unnecessary. For this reason, the present invention comprises an arrangement whereby the registration of calls at floors intervening between the position of a leading and a following car prevents the lighting of the warning light in the overtaking car until it approaches more closely to the leading car than would otherwise be the case.

As mentioned, the transferring operation just described is intended to promote an even spacing between the cars and to maintain the cars in proper rotation. To overcome the tendency of operators to disregard their transfer signals, informing them that they are approaching a leading car, the present invention is arranged so that failure to respond to the transfer signal results in the stopping of the overtaking car. As in the case of the transfer signal, the stopping action is controlled by any calls which exist for floors intervening between the leading and following cars. A following car, having been stopped behind a leading car is also prevented from restarting.

It is assumed, in the illustrated embodiment, that all cars have the same operating speed. Accordingly the just described transfer operations are required only in the event that a leading car is at rest. The transfer signal and stopping apparatus therefore respond to the approach of two cars only in the event the leading car is not moving.

The just described operations occur during downward travel of the cars and prevent an overtaking car from passing a leading car and disrupting the intended rotation in which the cars are intended to arrive at the lower terminal. As previously stated, for upward travel, the arrangement of the present invention is such that if a car approaches a leading car too closely, it is excluded from the signalling system.

The principal object of the present invention, accordingly, is to provide a control system for a plurality of cars having the above-mentioned operating characteristics.

A further object of the present invention is to provide improvements in structure which are applicable to a system having the above characteristics as well as to related systems of control.

Other objects and advantages of the present invention will become evident in the course of the following description, and are set forth in the claims.

Figure 3:
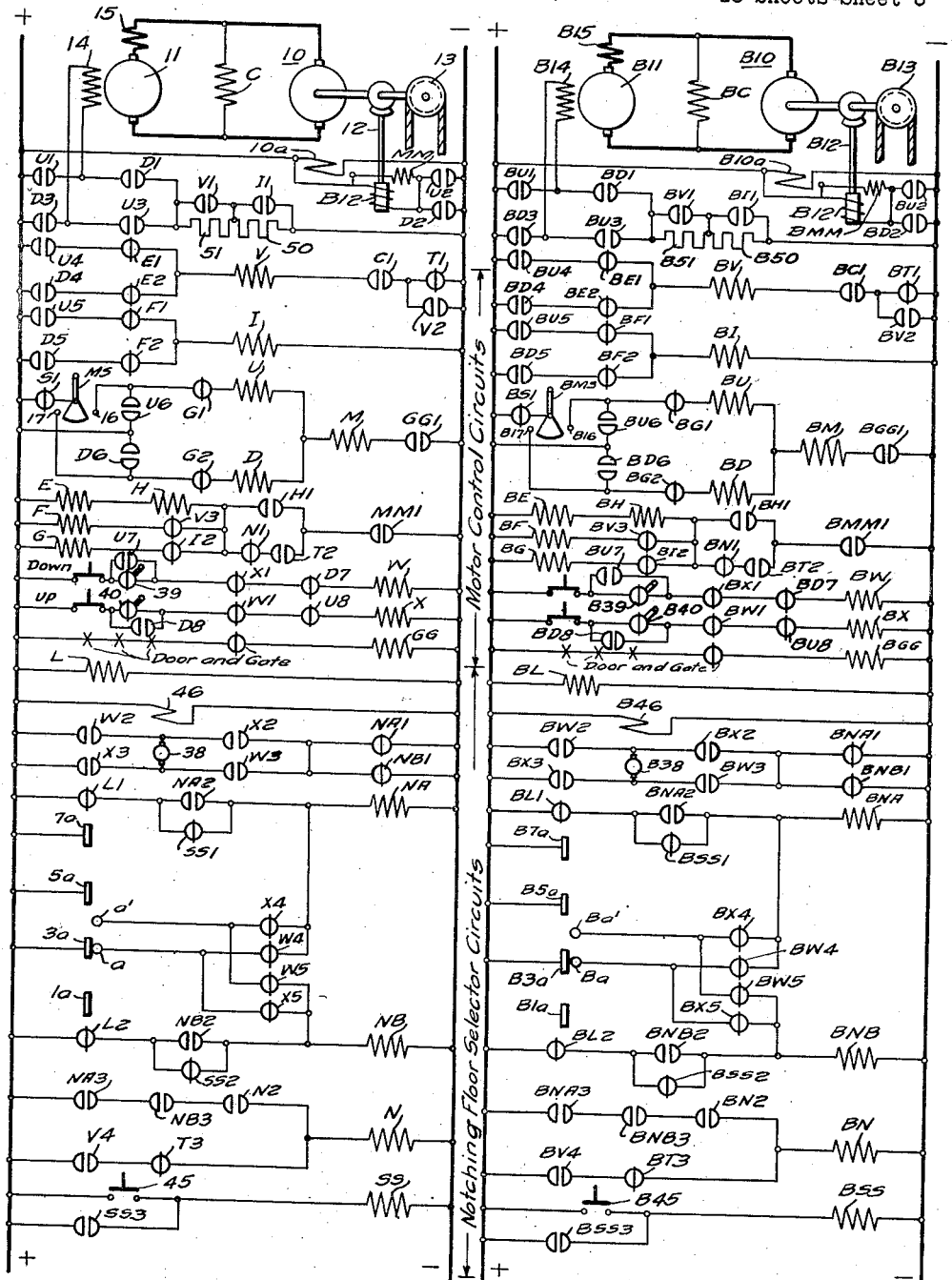
Figure 3A:
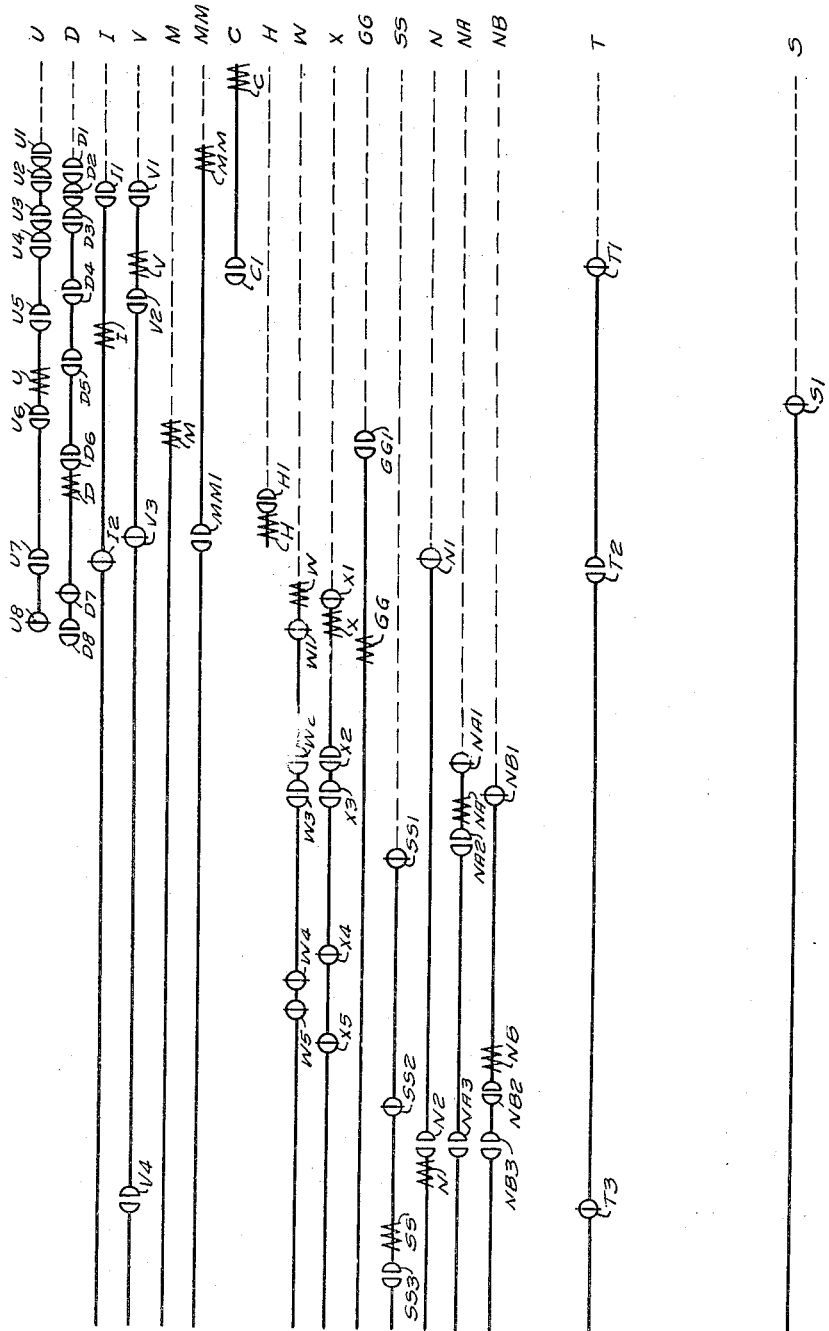

Figs. 3, 4, 5, 6, 7 and 8 jointly comprise a complete control system for two cars arranged in accordance with the present invention. In considering the system as a whole, these figures may conveniently be placed one above the other in the order named, with Fig. 3 at the top; and Figs. 3AA, 4A, 4AA, 5A, 5AA, 6A, 6AA, 7A, 7AA and 8AA are key sheets intended as a guide in locating the contacts and coils shown in Figs. 3 through 8. Fig. 3AA includes all the coils and contacts shown on Fig. 3 except those hereinafter identified as inductor switch coils or contacts, and any coil or contact on Fig. 3AA occupies the same horizontal position on Fig. 3. Similarly, Figs. 4A and 4AA include all of the coils and contacts shown in Fig. 4 and corresponding coils and contacts occupy the same horizontal positions on the key sheets as on Fig. 4. The remaining key sheets are correspondingly associated with Figs. 5, 6, 7 and 8.

Throughout Figs. 3 through 8 the circuits and apparatus shown on the left-hand side of each figure are associated with one car, designated car A. Corresponding apparatus shown on the right-hand side of each figure is associated with a second car designated car B. In certain instances, described in detail hereinafter, the apparatus is common to all cars of a bank. The control systems for cars A and B are identical. Accordingly, corresponding reference characters are used to designate corresponding elements in the control systems for both cars A and B with the exception that the reference characters for elements associated with car B have a prefix B. All other elements, the reference characters for which do not have the prefix B, are either individual to car A or are common to all cars of the bank. It will be understood that although complete control systems for only two cars are illustrated, the arrangement is equally applicable to banks of more than two cars.

Figure 6:
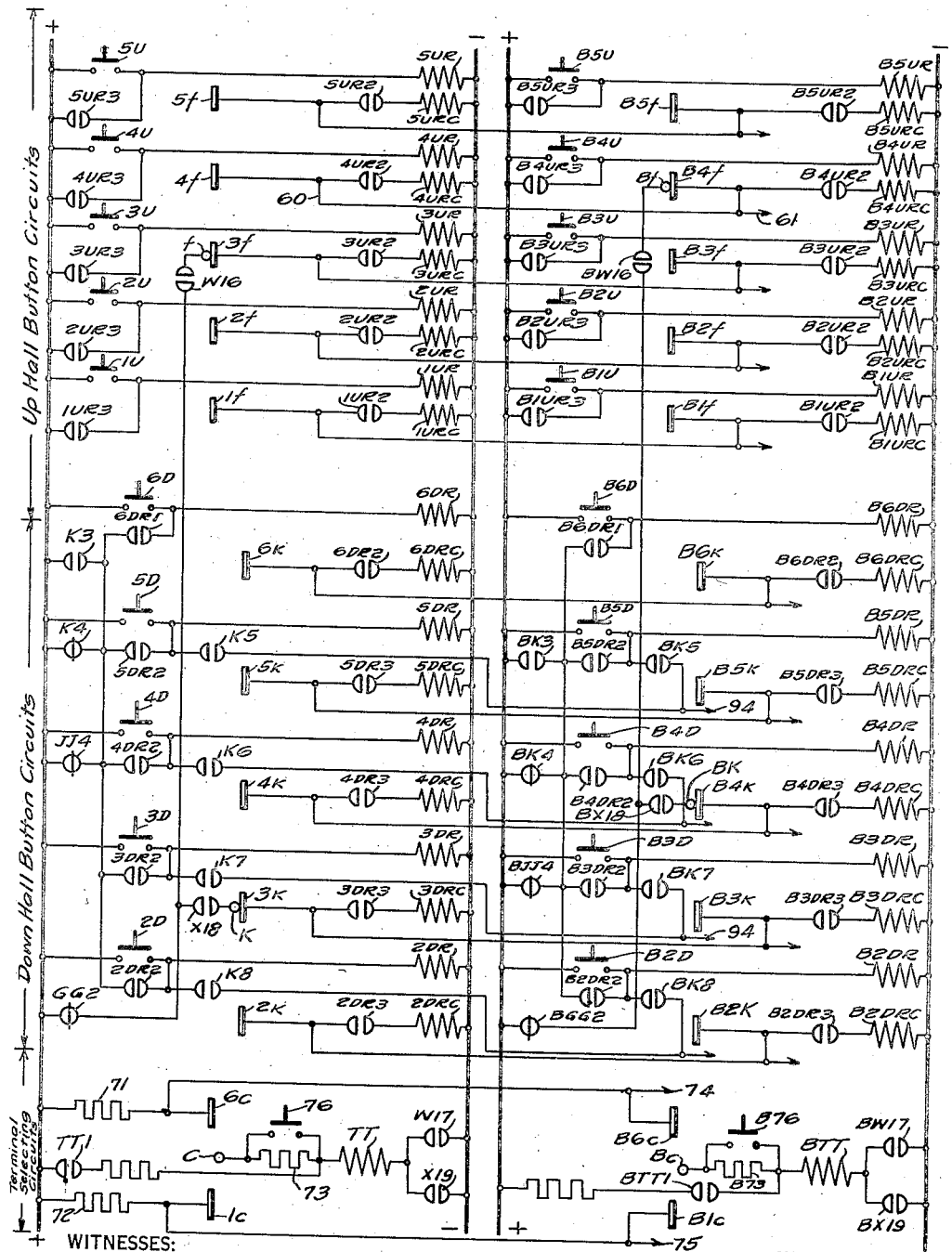
Figure 6A:
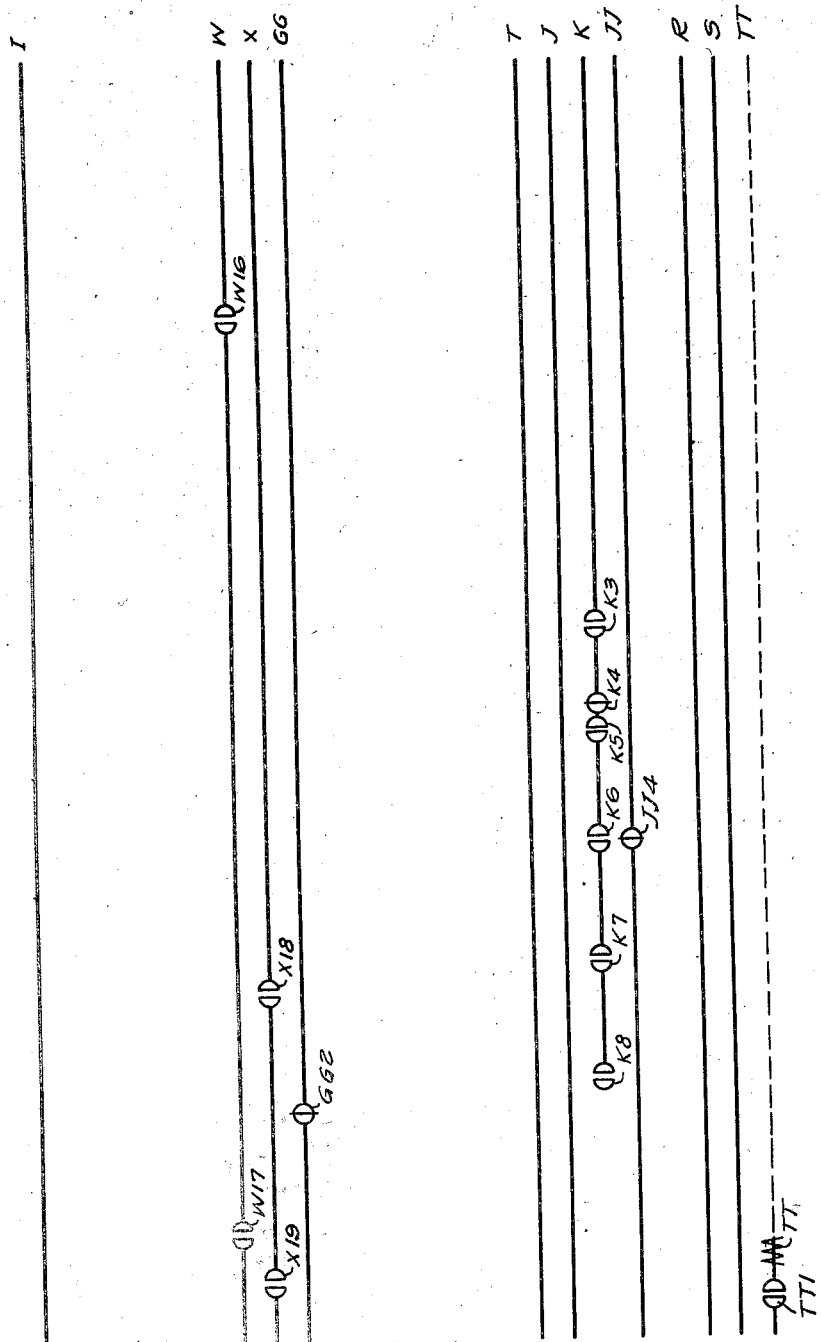

The circuits for registering hall calls are shown in Fig. 6. Car A is provided with a set of up buttons IU, 2U, 3U, 4U, and 5U for the first through fifth floors, inclusive, and a set of down buttons 2D, 3D, 4D, 5D, and 6D for the second through sixth floors, inclusive. In an installation involving more than six floors, corresponding additional buttons would, of course, be provided. Corresponding push buttons are provided for car B.

A call registering floor relay is associated with each push button, corresponding sets of floor relays being provided for both cars A and B. Each floor relay is provided with an operating coil and a resetting coil. These two coils are wound upon the same core, but are magnetically opposed so that energization of the operating coil operates the relay and subsequent energization of the resetting coil restores the relay to the deenergized position. The operating coil for the first floor relay associated with car A is designated IUR, and the corresponding resetting coil is designated IURC. The remaining relays associated with car A are correspondingly designated, the floor and direction being indicated by the prefix figure and by the letter U, or D, appearing in the reference character. Corresponding floor relay operating and resetting coils for car B are similarly designated.

Figure 4:
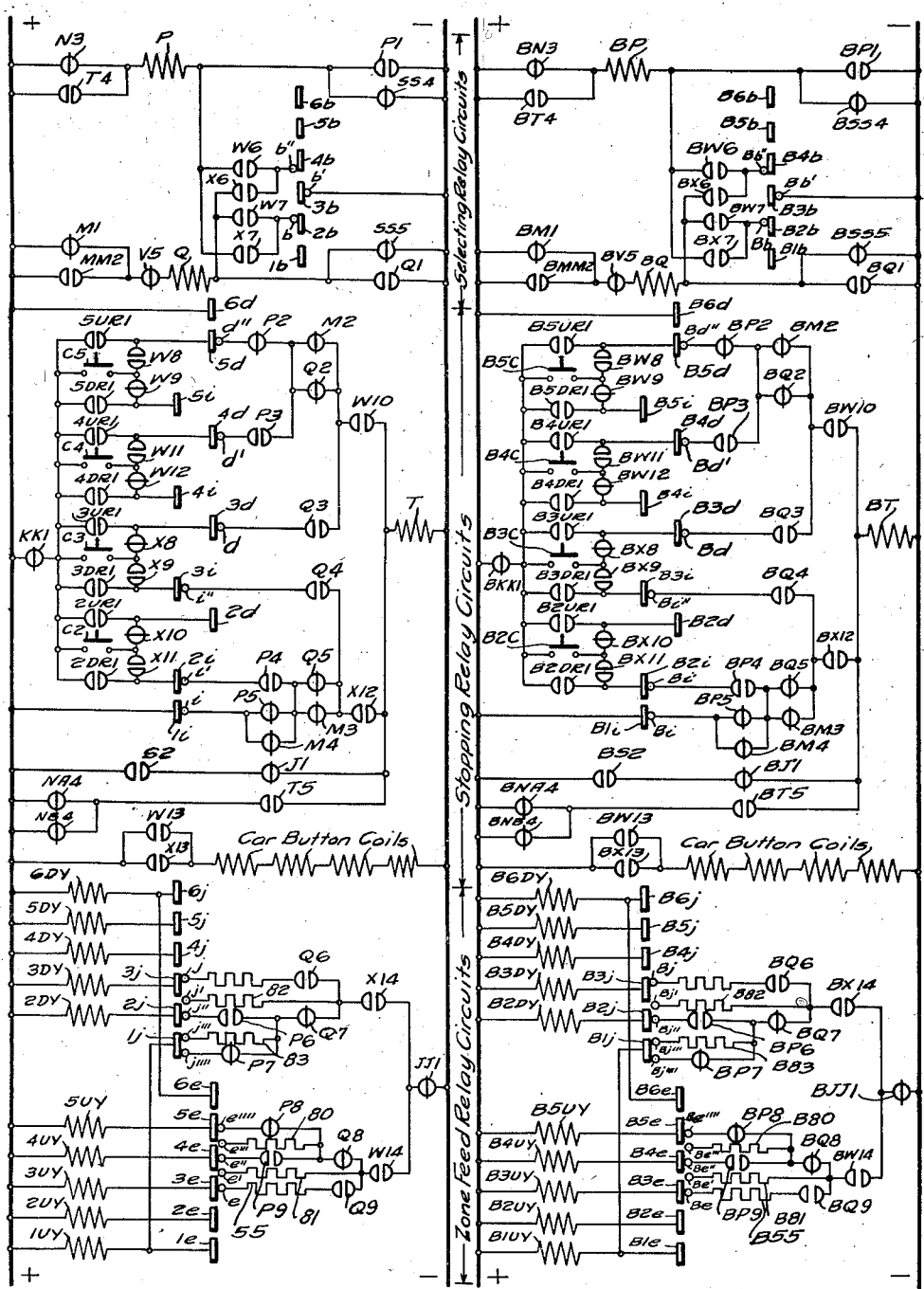
Figure 4A:
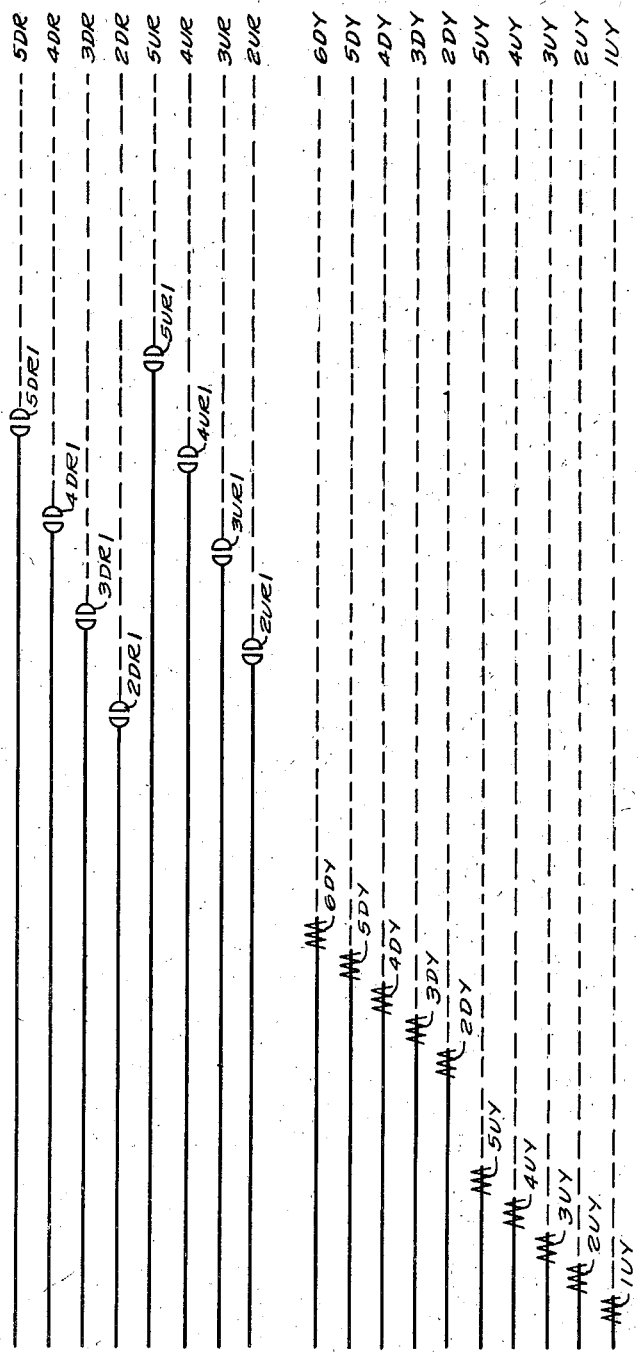
Figure 4A:
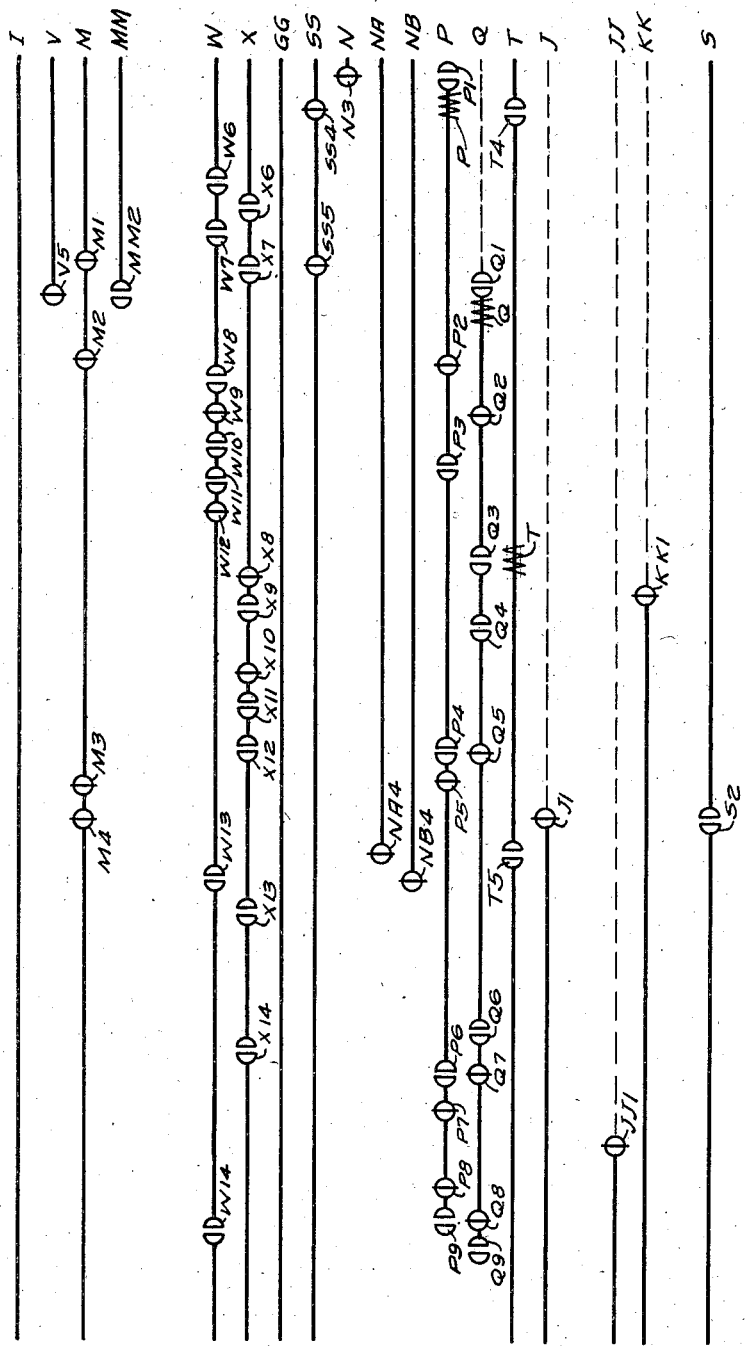

Each car of the bank is also provided with a set of car buttons individual to it, one car button being provided for each floor except the terminal floors. The car buttons and the associated circuits are shown at the top of Fig. 4, the car buttons for car A being designated C5, C4, C3, and C2. The corresponding car buttons for car B are similarly designated, with the prefix B.

The car buttons are illustrated as being of the manually closed, electromagnetically retained, type. The retaining coils, one for each button, are shown in Fig. 4 somewhat below the corresponding car buttons and are designated with the legend "car button coils". These coils are continuously excited except for a momentary period of deenergization which occurs each time the car is reversed. Each coil, while ineffective to move the associated button to closed position, is effective to retain it in that position.

As shown in Fig. 4, the car buttons are connected in parallel with contacts on the floor relays for corresponding floors so that registration of either a car or a hall call prepares a circuit which, upon the approach of the corresponding car to the corresponding floor, is completed and operates a stopping relay T. As is later described, relay T transfers calls to the mechanism directly concerned with the slowdown and stopping of the cars, shown in Fig. 3.

The particular slowdown and stopping mechanism, as well as the particular system of motor control employed, forms no part of the present invention, but have been illustrated as comprising inductor switches arranged to control a Ward-Leonard or variable voltage system of motor control. Referring to Fig. 3, the motor control system for car A comprises generally a motor 10 having an armature electrically connected with the armature of a generator 11, and a continuously excited field winding 10a. The shaft of motor 10 carries a brake drum for cooperation with the usual electromagnetically released, spring applied, brake 12 and a sheave 13 over which the hoisting cables are passed in the usual manner. Generator 11 is provided with a separately excited field winding 14, the excitation of which may be selectively controlled as to direction and degree by means of up and down reversing switches U and D and accelerating switches V and I. Suitable speed mechanism intended to maintain the speed of motor 10 independent of the elevator load is illustrated as comprising a cumulative series field winding 15 associated with generator 11.

The reversing switches U and D and the speed switches U and I are controlled, in accelerating the car, by means of a master switch MS carried upon the elevator car and comprising an up contact 16 and a down contact 17; and, during slowdown, by means of a series of inductor switches, the coils of which are designated E, F and G. The inductor switches are preferably of the type disclosed in Patent 1,902,602, granted March 21, 1933, to Williams, et al., and assigned to the Westinghouse Electric & Manufacturing Company, and, as shown in Fig. 1, are mounted upon the elevator car in a position to cooperate magnetically with a series of inductor plates UE, UF, UG, etc., mounted in the hatchway.

As described in the above Williams patent, each inductor switch E, F and G, and the corresponding inductor switches for car B, comprises an energizable coil, a suitable magnetic structure and two contact-carrying armatures. The arrangement is such that energization of the coil has no effect upon the associated armatures. If, however, a magnetic plate is brought into the region of either armature that armature is actuated to the contact-opening position and remains in that position until the coil is deenergized, even though the plate is later removed from the region of the switch.

Figure 1:
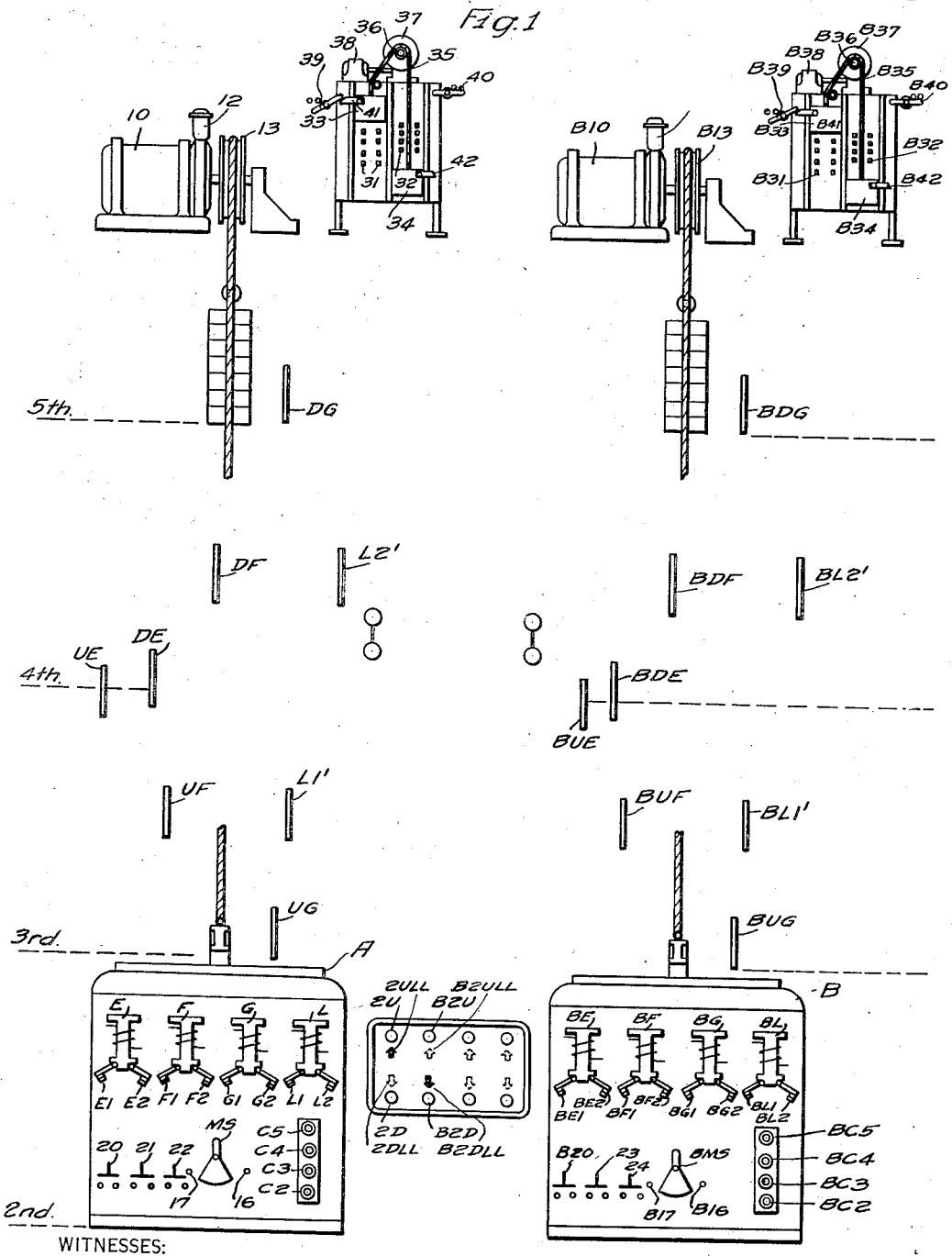
Figure 1 is a view showing the relation between several of the mechanical elements of the system.

Referring to Fig. 1, inductor switches E, F and G are each provided with up contact members $E_1$, $F_1$ and $G_1$, respectively, and down contact members $E_2$, $F_2$ and $G_2$, respectively. Inductor plates UE and DE for the up and down directions respectively are associated with inductor switch E. Corresponding plates UF and DF are associated with inductor switch F and plates UG and DG are associated with inductor switch G. Although only a single complete set of plates is illustrated, it will be understood that each intermediate floor and the upper floor is provided with a complete set of up plates, and that each intermediate floor and the lower terminal floor is provided with a complete set of down plates. The inductor switches and inductor plates for car B are similarly arranged. Referring again to Fig. 3, the coils of inductor switches E, F and G for car A are controlled by contacts of the previously-mentioned stopping relay T, a selecting relay N, a holding relay H and a control relay MM.

The motor control system also comprises an up direction determining relay W, a down direction determining relay X, a control relay M, and a voltage responsive relay C, the operation of which is described later in connection with a detailed statement of operation.

Figure 7:
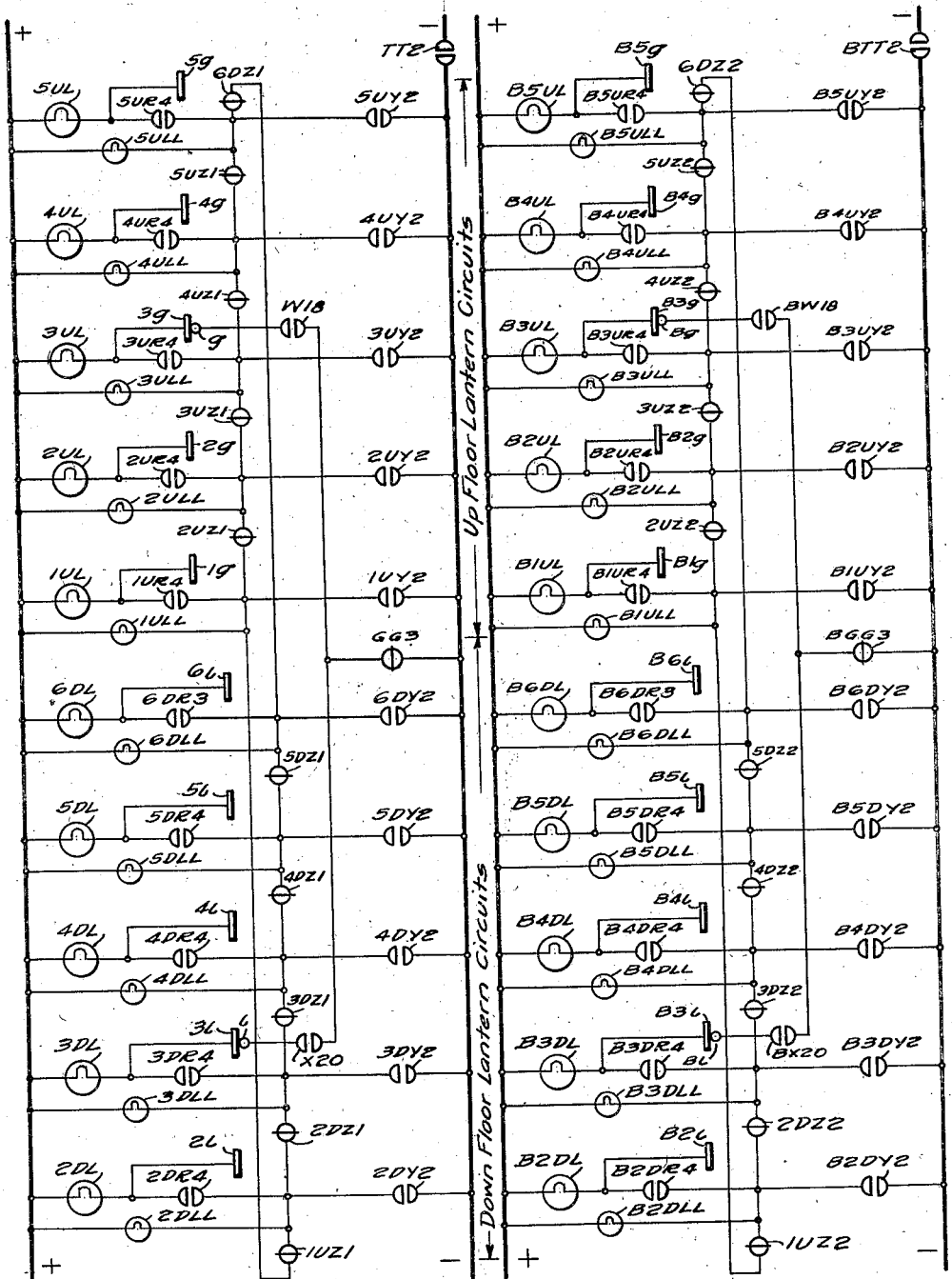
Figure 7A:
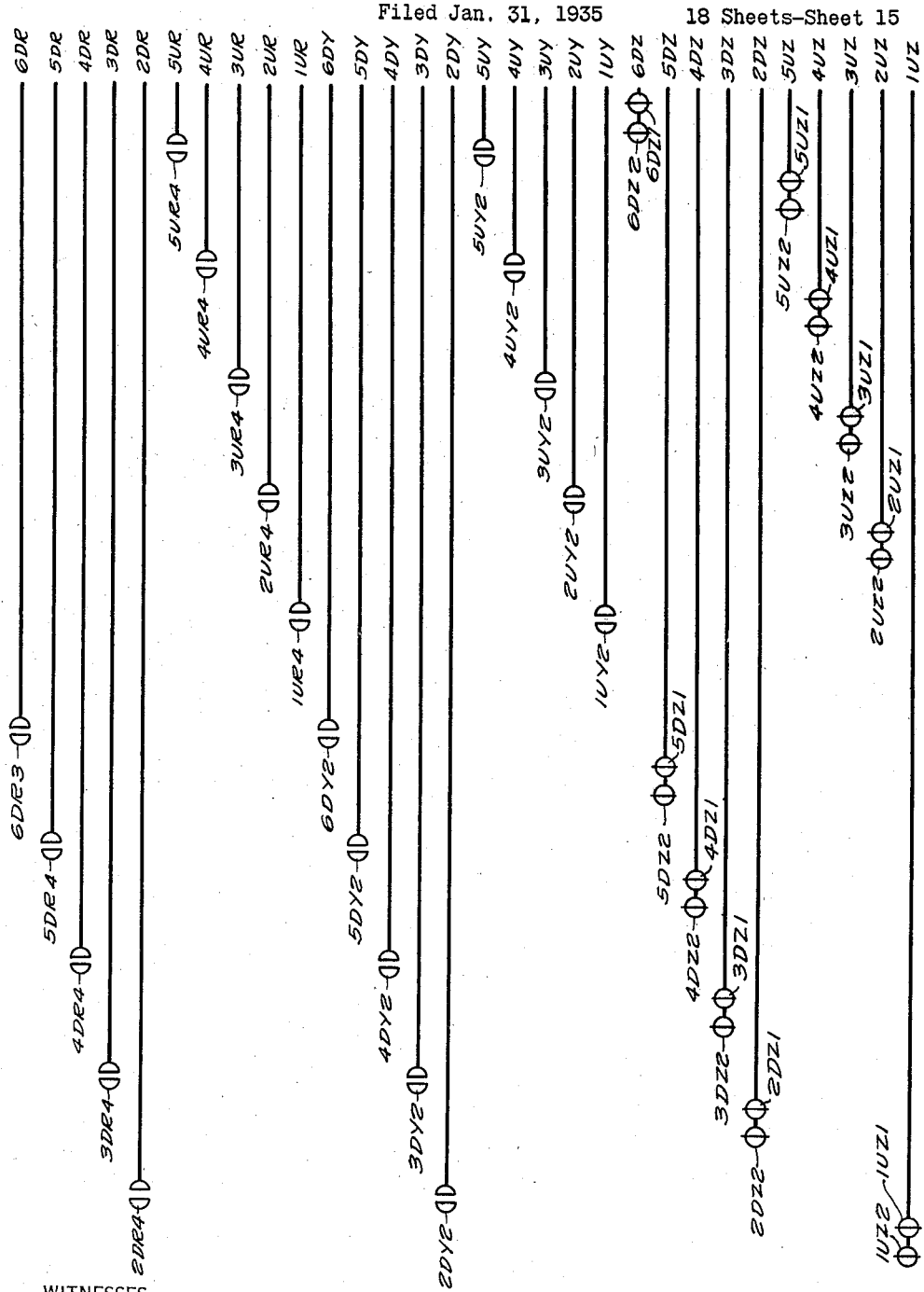

The circuits for controlling the floor lanterns, which, as previously stated, operate to inform intending passengers that their calls have been registered, and the indicating lights which are continuously illuminated, subject to the zoning mechanism, to inform intending passengers which of the cars is nearest and which button should be operated, are shown in Fig. 7. Referring to Fig. 7, car A is provided with an up lantern and a down lantern at each intermediate floor landing, designated 2UL, 3UL, 4DL, etc., a down lantern designated 6DL for the upper terminal floor and an up lantern designated 1UL for the lower terminal floor landing. Car B is similarly provided, each lantern reference character having the prefix B. Car A is also provided with an up indicating light and a down indicating light for each intermediate floor designated 2ULL, 3ULL, 4DLL, 5DLL, etc., a down indicating light 6DLL for the upper terminal floor, and an up indicating light 1ULL for the lower terminal floor. Car B is similarly provided.

The mechanism for controlling both the floor lanterns and the indicating lights in accordance with the relative positions of the cars comprises a set of zoning relays common to all cars of the bank and a set of zone feed relays individual to each car of the bank. The circuits for operating the common zoning relays are shown in Fig. 5 and the circuits for controlling the zone feed relays are shown at the bottom of Fig. 4.

Referring to the latter figure, car A is provided with an up zone feed relay and a down zone feed relay for each intermediate floor, designated 2UY, 3UY, 4DY, etc., a down zone feed relay 6DY, for the upper terminal floor and an up zone feed relay 1UY for the lower terminal floor. Car B is similarly provided. The zone feed relays for each car are caused to respond to the position and direction of travel of the associated car by means of segments and brushes on the floor selector, as later described.

Figure 5:
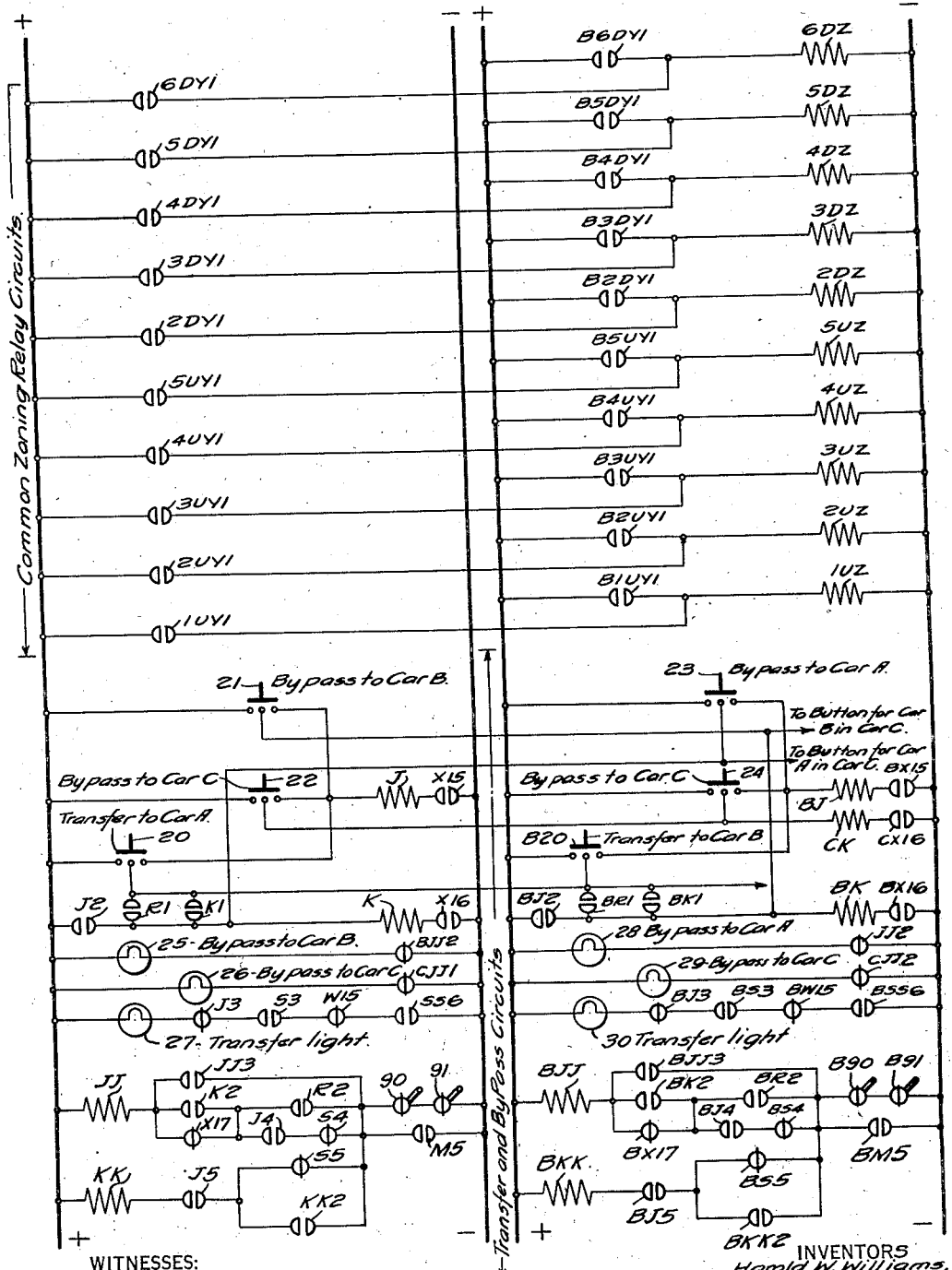
Figure 5A:
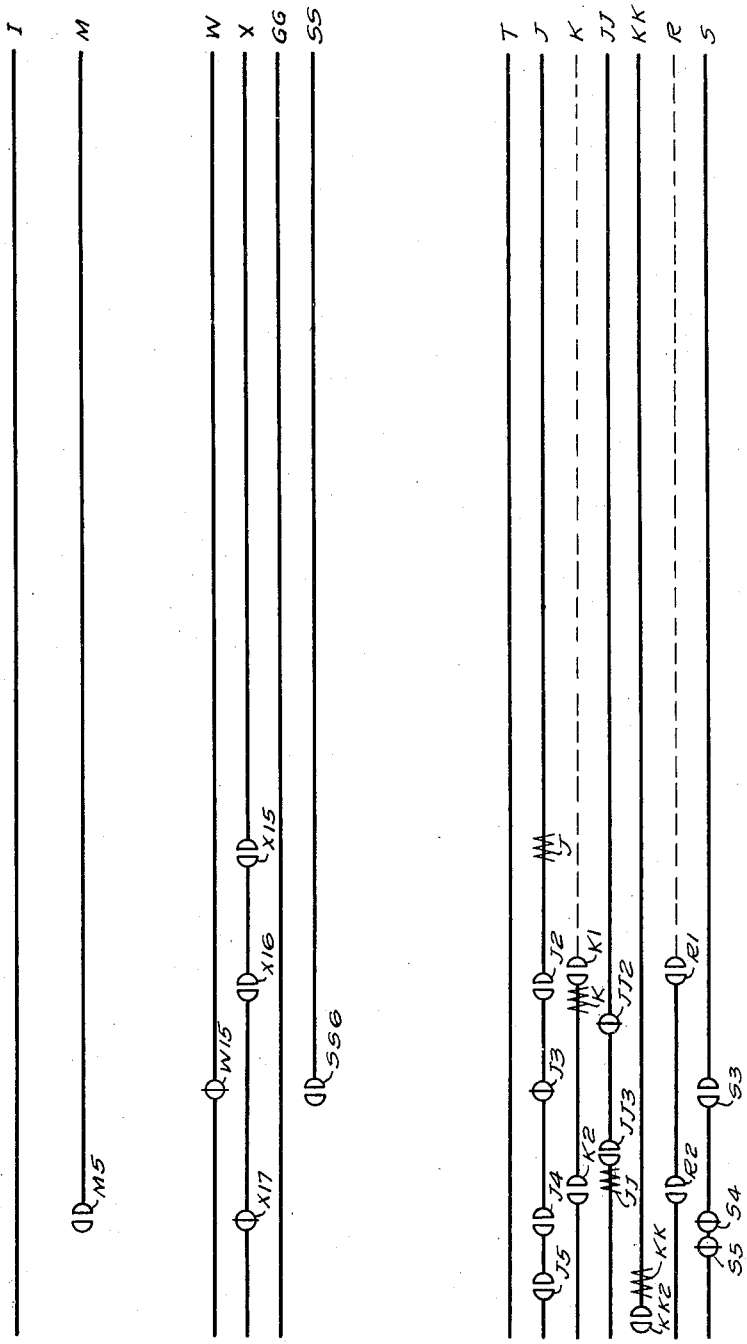

Referring to Fig. 5, contacts on corresponding zone feed relays for all of the cars are connected in parallel and so jointly control the circuits for the coils of corresponding zoning relays. The common zoning relays are designated 2UZ, 3UZ, 4DZ, 5DZ, etc.

As later described the zoning relay mechanism divides the floors of the building into zones, determined by the relative positions of the respective cars. At any time, subject to the action of the transfer mechanism described later, the zone for a given car extends from the position of that car to the position of the next car travelling in the corresponding direction, or in the absence of such next car, to the corresponding terminal and back to the position of the nearest car travelling in the opposite direction. As is later described in connection with Fig. 7, all of the indicating lights for all floors in the zone for a particular car are continuously illuminated and operation of any buttons for a particular car in the zone for that car immediately light the corresponding floor lanterns.

In the event that two or more cars are standing at a terminal at the same time, the zones for the respective cars are determined by means of terminal selecting mechanism illustrated at the bottom of Fig. 6. The terminal selecting mechanism for car A comprises a relay TT, and the corresponding apparatus for car B comprises a relay BTT. Each relay is arranged to be operated upon the arrival of the corresponding car at either terminal floor, provided no other car is standing at that terminal floor, and upon operation, establishes a zone for that car. Having been operated, either relay TT or BTT remains in operated position until the corresponding car either reaches the opposite terminal or is reversed at an intermediate floor.

Figure 8:
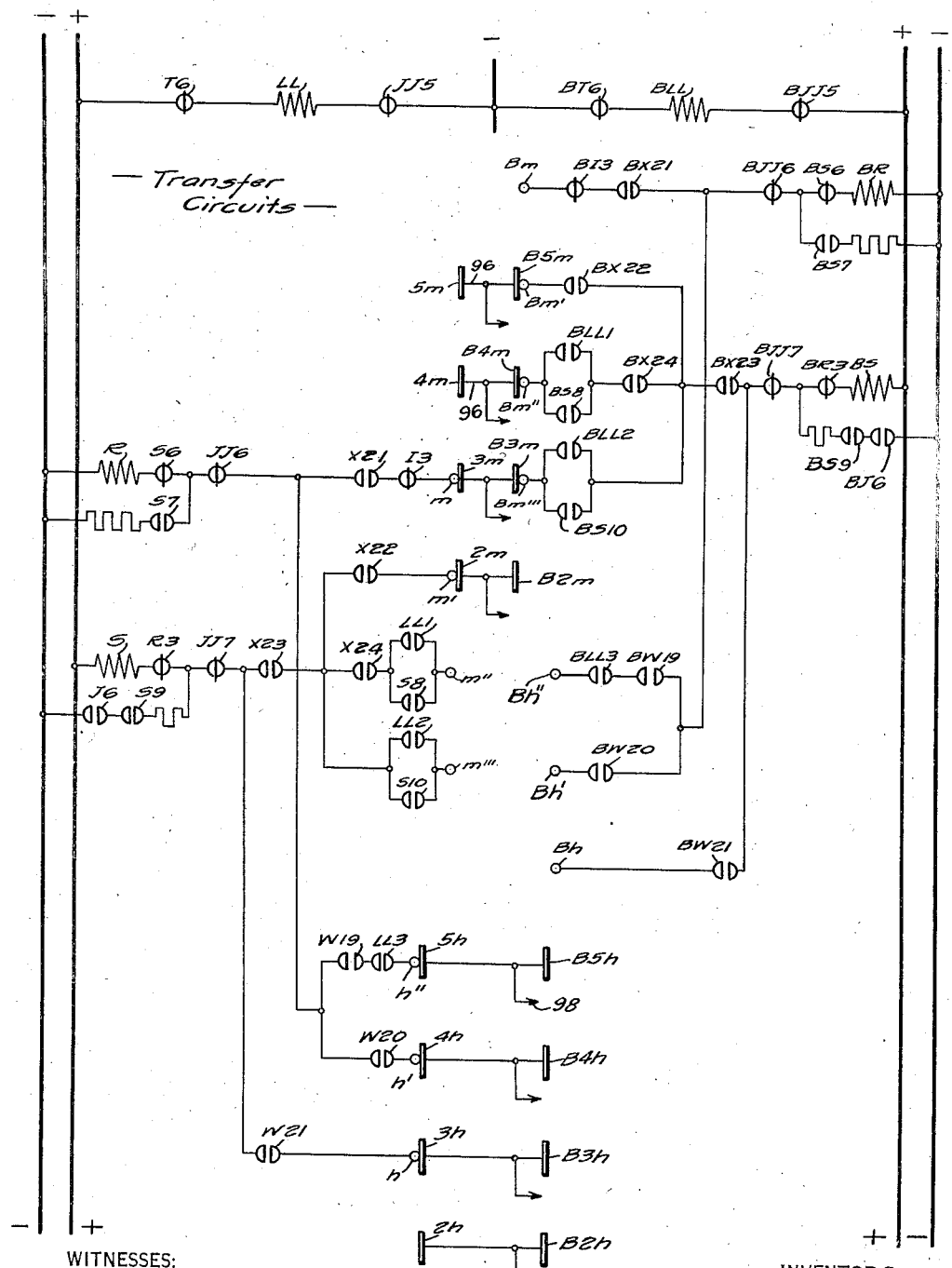
Figure 8A:
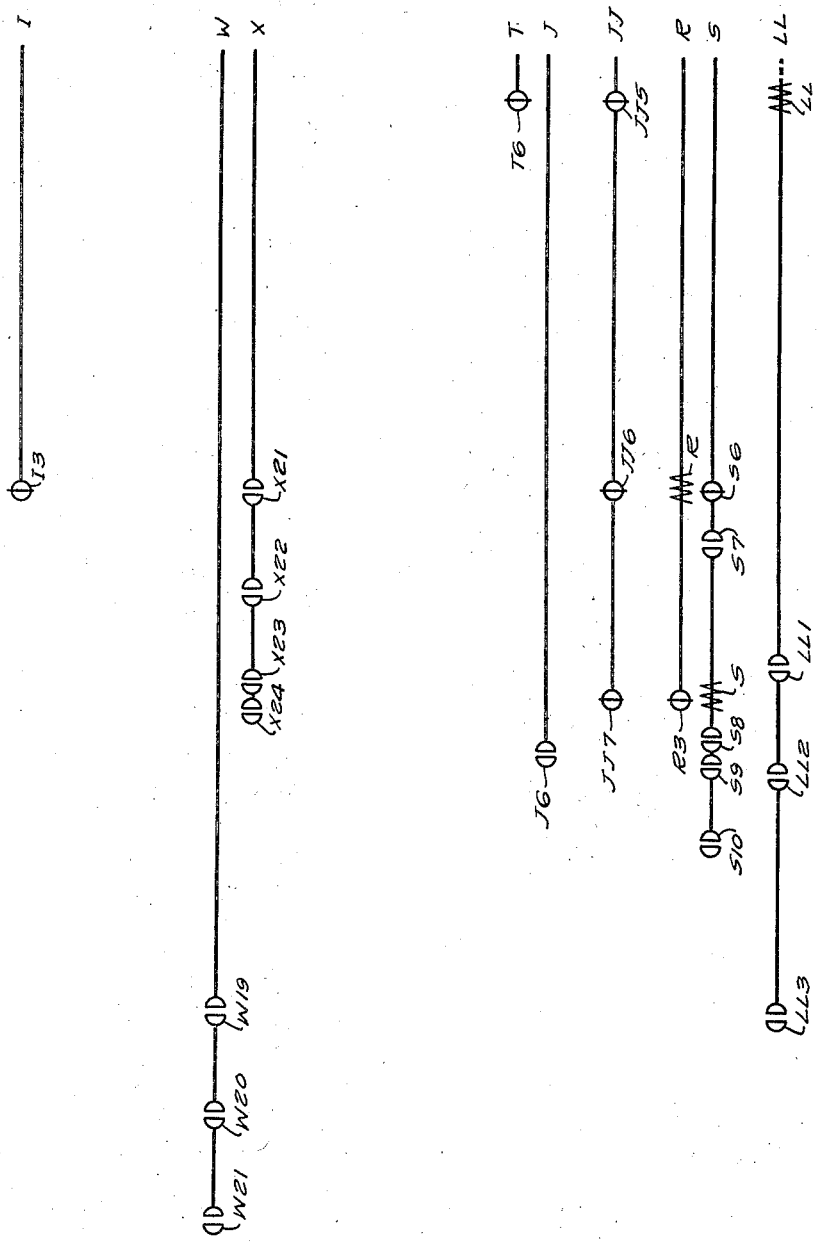

The mechanism for transferring calls from one car to another is illustrated in the lower part of Fig. 5, and in Fig. 8. Referring to the lower part of Fig. 5, car A is provided with a transfer button 20, by-pass buttons 21 and 22, by-pass signals 25 and 26, and a transfer signal 27. Car B is provided with corresponding apparatus designated B20, 23, 24, 28, 29 and 30.

Pass buttons 21 and 22 for car A are provided for operation in the event that it is desired to transfer calls from car A to a following car and signals 25 and 26 are provided in car A to identify the nearest car. As previously mentioned, the control systems for all cars of a bank are identical so that the illustration of the systems for two cars and interconnections between them serves as an illustration of the control systems and interconnections for all cars of the bank. In connection with the circuits shown in the lower part of Fig. 5, however, it is thought desirable to include certain connections for a third car and for this reason, certain control elements, such as the lamps 26 and 29, and contacts CJJ1 and CJJ2, controlled by car C, (not shown) have been illustrated.

In response to the indication given by lamps 25 and 26, the operator of car A will preferably operate the corresponding button 21 or 22. Operation of button 21 results in the transfer of all hall calls from car A to car B, and operation of button 22 results in the transfer of all hall calls from car A to car C.

Transfer button 20 is provided for operation by the operator of car A in the event that car A approaches within a predetermined distance of an advance car travelling in the corresponding direction, transfer light 27 being provided to inform the operator of car A when such an operation should occur.

The corresponding transfer and by-pass buttons, and signal lights associated with car B, perform corresponding functions, as indicated by the legends opposite each of these elements. It will be understood that car C is provided with a corresponding group of elements.

Referring to Fig. 6, each car of the bank is provided with two transfer relays, those for car A being designated R and S, and those for car B being designated BR and BS. The circuits for each of these relays extend to and are controlled by segments and brushes on the floor selectors individual to the respective cars. All corresponding floor selector segments, that is, for a corresponding direction and floor, for all cars, are connected directly in parallel. As a consequence, when any two interconnected segments are both engaged by a brush associated with two different cars, the relay R or BR for the leading car is energized and the relay S or BS for the trailing car is energized. The spacing between the cars at the time this operation occurs is, of course, determined by the extent to which the brushes for each car extend in advance of the position of that car. Each car is provided with four down brushes and three up brushes concerned with this operation, the individual brushes of each group being selectively controlled in accordance with the speed, direction of travel, and the existence of registered calls of the associated car.

Completion of one of the above-described circuits, for example, for relays R and BS, operates the transfer light of the trailing car, in this case light 30 of car B, and prepares the circuits to enable a transfer of calls from car B to car A. As previously mentioned, this transfer is completed by operation of pass button B20 in the trailing car. This operation is described in more detail hereinafter. The circuits for relays R and BR, S and BS also function during up-travel of the cars, to exclude an overtaking car from the signalling system.

Figure 2:
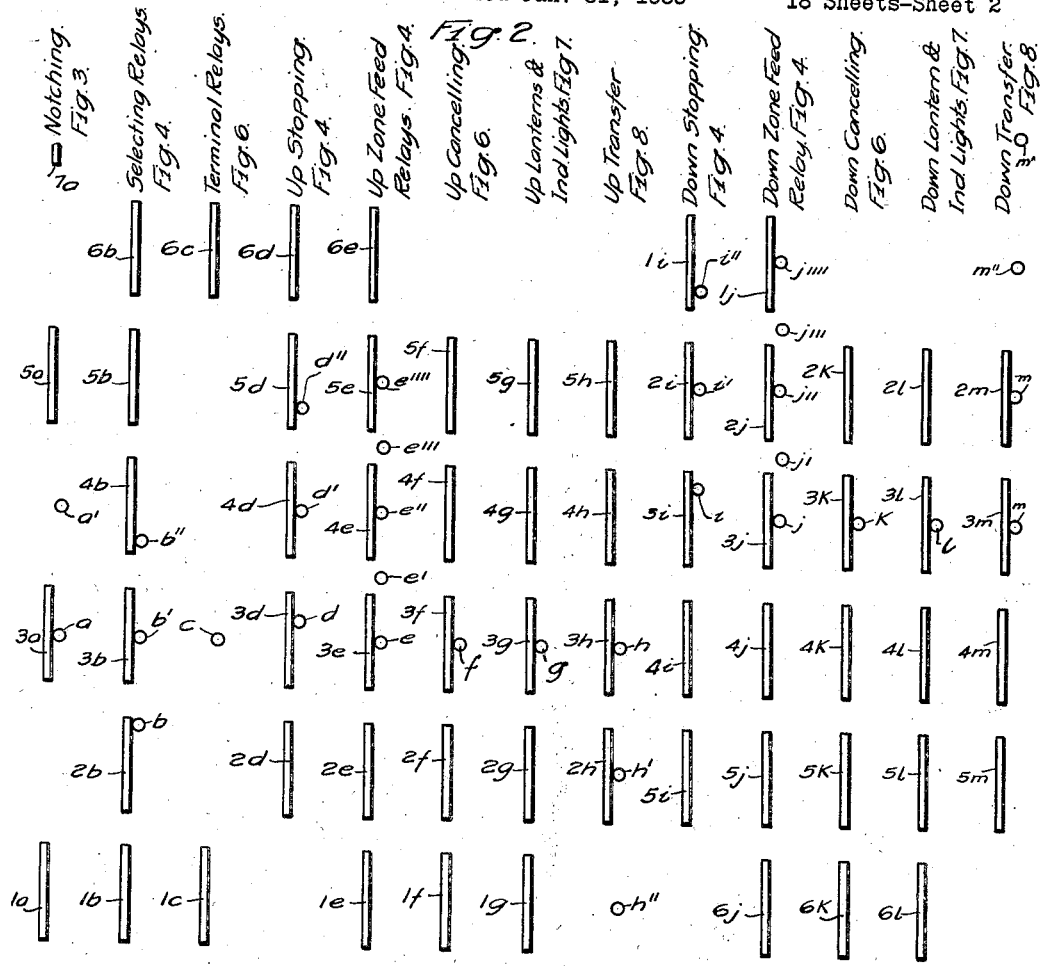
Fig. 2 is a view in detail of parts of a floor selector, showing the relative positions of the floor selector brushes and segments for different positions of the elevator car.

The circuits corresponding to the different floors are commutated, in the illustrated embodiment of the present invention, by means of floor selectors individual to the respective cars, and illustrated, generally, in Fig. 1, and in somewhat more detail in Fig. 2. The floor selectors for each of cars A and B, as well as any other cars of the bank, are identical.

The floor selector for each car comprises a plurality of rows of conducting segments, the different segments in each row corresponding in general to the different floors of the building or to different positions of the associated car in its hatchway. These segments are mounted on a stationary panel and are indicated generally by the reference characters 31 and 32.

Certain of the rows of segments function during both directions of car travel, others only during up travel and the remainder only during down travel. For convenience, it is assumed that the rows shown on the left hand half of the panel and designated generally by the reference character 31 are those which function for both directions of travel and for up travel, and that those which are shown at the right hand side of the panel and designated 32 are those which function during down travel.

One or more conducting brushes are associated with each row of segments and are carried on brush carriages 33 and 34 in position to successively engage the different segments in the associated row. The construction of the conducting brushes and the mounting thereof on the corresponding brush carriages forms no part of the present invention and these elements, therefore, are not illustrated in detail. Referring to Fig. 2, however, the individual segments and the number and general arrangement of the cooperating brushes is shown in schematic form. Fig. 2 is intended as a guide to show the relative positions of the brushes and segments for different positions of the associated elevator car. The purpose of each row of segments is stated generally in the legends at the top of the figure and each circular element a, a', b, b' represents a brush. As stated in the legend appearing at the bottom of the figure, the brushes are shown in the position occupied while car A is in the notching zone of the third floor, that is, the position occupied at the completion of a notching operation below the third floor, travelling upwardly, or above the third floor, travelling downwardly. At each notching point, each brush advances to a corresponding position with respect to the next segment in the corresponding row. Thus during upward travel each brush in the left hand half of the figure moves upwardly one notching distance and those on the right hand side of the figure move downwardly one notching distance. During downward travel, an opposite action occurs.

The various segments and brushes shown in Fig. 2 are given corresponding reference characters throughout Figs. 3, 4, 5, 6, 7 and 8 and are illustrated by correspondingly shaped elements. The operations controlled by the respective rows of segments and brushes is described in more detail hereinafter.

Brush carriages 33 and 34 are driven by a motor 38, through a cable 35, sheave 36 and suitable gear reducing mechanism 37. An inductor switch L, carried upon the elevator car, causes intermittent operation of motor 38 in one direction or the other as the associated car moves upwardly or downwardly. The general arrangement of this apparatus is as shown and described in Patent No. 1,979,679, granted November 6, 1934 to Charles E. Ellis, and assigned to the Westinghouse Electric Elevator Company and is described more in detail hereinafter.

Notching inductor switch L is of substantially the same construction as inductor switches E, F and G with the exception that the contacts L1 and L2 thereof resume the closed position as soon as switch L passes out of the region of a cooperating inductor plate, even though the coil of notching switch L remains energized. As shown in Fig. 1, notching switch L is carried on the car and two rows of plates are provided in the hatchway, one row being arranged to cooperate with contacts L1 and the other row being arranged to cooperate with contacts L2. Each row of plates includes a plate for each other floor, the plates being located to cause an operation of switch L each time car A reaches a point approximately midway between adjacent floors. The row, including plates L1' which cooperates with contacts L1 is arranged to function when the car is midway between the first and second, third and fourth, fifth and sixth, etc. floors. The other row, including plates L2', functions when the car is at intervening points.

Detailed description of operation

The functions of the various relays and switches shown throughout Figs. 3 through 8, and which are either individual to car A or common to both cars A and B are as follows. As previously noted, the control systems for cars A and B are identical so that corresponding elements for car B have the same functions as given for car A.

Relays individual to car A

6DR, 5DR, 4DR, 3DR, 2DR } Down floor relays

5UR, 4UR, 3UR, 2UR, 1UR } Up floor relays

6DY, 5DY, 4DY, 3DY, 2DY } Down zone feed relays

5UY, 4UY, 3UY, 2UY, 1UY } Up zone feed relays

U—Up reversing switch
D—Down reversing switch
I—Intermediate speed switch
V—High speed switch
M—Control relay
MM—Auxiliary control relay
C—Voltage relay
H—Auxiliary stopping relay
W—Up direction relay
X—Down direction relay
GG—Door and gate relay
SS—Service relay
N—Selecting relay
NA—Notching relay
NB—Notching relay
P—Selecting relay
Q—Selecting relay
T—Stopping relay J, K, JJ, KK, R, S } Transfer relays TT—Sequence relay
LL—Auxiliary transfer relay

Relays common to all cars

5UZ, 4UZ, 3UZ, 2UZ, 1UZ } Up zoning relays

6DZ, 5DZ, 4DZ, 3DZ, 2DZ } Down zoning relays

Throughout Figs. 3 through 8, the circuits associated with different control operations are divided into more or less independent groups indicated by brackets and identifying legends.

Notching floor selector operation

All of the apparatus involved in this operation is shown in Fig. 3 and comprises the previously mentioned notching motor 38, notching inductor switch L, notching relays NA and NB, service relays SS, contacts on the up and down direction relays W and X, brushes a and a' and cooperating segments 1a, 3a and 5a. Referring to Fig. 2, it is noted that row 1 includes a segment for every other floor and that brushes a and a' are spaced apart a distance corresponding to one notching distance. With car A standing at the third floor, brush a is in engagement with segment 3a, and brush a' is midway between segments 3a and 5a, as illustrated.

Assuming that the line conductors + and — are now energized, notching relays NA and NB and one or the other of the direction relays W and X are operated. Assuming that it is desired that the next movement of car A shall be in the up direction, the button marked "up" may be opened momentarily, interrupting the circuit for down direction relay X, permitting the establishment of a circuit for up direction relay W which includes the button marked "down", a terminal switch 39, normally closed contacts X1 and interlock contact D7 in the coil of relay W. Upon completion of this circuit, relay W operates, opening contacts W1, W4 and W5 and closing contacts W2 and W3, all in Fig. 3. Relay W also operates certain additional contacts which are not of interest in connection with the operation now being described. Throughout this and the other descriptions following the different sub-headings, contacts of a particular switch not concerned with the particular operation being described, are disregarded.

The opening of contacts W1 prevents completion of a circuit for down direction relay X until the car either reaches the upper terminal or until, in order to effect a reversal at an intermediate floor, the button marked "down" is momentarily opened. Limit switch 39 and a corresponding limit switch 40 in the circuit of down direction relay X are arranged to be opened when the car arrives at the upper and lower terminals respectively, and are preferably mounted on the floor selector for actuation by cams 41 and 42, respectively, (Fig. 1).

Contacts W2 and W3 prepare an armature circuit for selector motor 38 which, in response to operation of relays NA and NB, cause motor 3 to operate the floor selector in the up direction. The operation of these contacts is without effect at this time, since contacts NA1 and NB1 are both open, as described below.

The circuits for relays NA and NB are as follows, respectively. From + through contacts L1 and SS1 and coil NA to —, and from + through contacts L2 and SS2 and coil NB to —. Relays NA and NB, in operating, open contacts NA1 and NB1 and close contacts NA2 and NB2, respectively. The opening of contacts NA1 and NB1 prevents completion of a circuit for the armature of selector motor 38. Contacts NA2 and NB2 complete self-holding circuits for coils NA and NB respectively, which are independent of service relay contacts SS1 and SS2.

To condition the system for operation, button 45 may be operated, completing a circuit for service relay SS which, in operating, opens contacts SS1 and SS2, and closes contacts SS3. Contacts SS3 complete a self-holding circuit for coil SS which accordingly remains operated as long as car A remains in service.

The opening of contacts SS1 and SS2 is without effect in view of the previously described holding circuits for coils NA and NB. These contacts are provided to complete an initial energizing circuit for relays NA and NB, at the time car A is placed in service.

If car A is now started upwardly in the manner later described, the upward movement of the car will bring notching inductor switch L opposite a plate L1'. As previously described, this will occur when the car is approximately midway between the third and fourth floors. This operation momentarily opens contacts L1, interrupting the previously described circuit for relay NA, which resumes the deenergized position, closing contacts NA1 and opening contacts NA2.

The opening of contacts NA2 is without effect, but the reclosure of contacts NA1 completes a circuit for the armature of selector motor 38 which also includes now closed contacts W2 and W3. Field winding 46 of motor 38 may be assumed to be continuously energized so that completion of the above described armature circuit causes motor 38 to start in a direction to move brush carriage 33 upwardly and to move brush carriage 34 downwardly.

When inductor switch L moves out of range of inductor plate L1', contacts L1 reopen without effect since contacts NA2 and SS1 are now open.

In the course of the upward movement of brush carriage 33, brush a is moved out of engagement with segment 3a. This operation is, however, without effect. At the completion of the movement of brush carriage 33 one notching distance, brush a' is moved into engagement with segment 5a, at which time brush a occupies a position midway between segments 3a and 5a.

The engagement of segment 5a by brush a' recompletes a circuit for notching relay NA, which circuit includes now closed contacts X4. Upon completion of this circuit, relay NA reopens contact members NA1, stopping selector motor 38 and recloses contacts NA2, completing a self-holding circuit for coil NA.

The parts are now in the same condition as when car A was standing at the third floor with the exception that brush a is no longer in engagement with a segment and brush a' has been moved into engagement with segment 5a. Brush carriages 33 and 34 have each been advanced one notching distance.

If the upward movement of car A is continued, inductor switch L is moved into the region of a second inductor plate L2' when the car reaches a point approximately midway between the fourth and fifth floors. As previously mentioned, the inductor plates designated L2' are in a separate row and cooperate with inductor switch L to open contacts L2. Accordingly, upon the arrival of car A at the notching point between the fourth and fifth floors travelling upwardly contacts L2 open, deenergizing relay NB, which resumes the deenergized position reclosing contacts NB1 and reopening contacts NB2. The latter contacts are without effect, but contacts NB1 recomplete the previously described armature circuit for selector motor 38 causing it to restart in the same direction.

In the course of the consequent movement of brush carriage 33, segment a' is moved out of engagement with segment 5a, without effect, and at the completion of the notching movement brush a is moved into engagement with segment 5a.

The engagement of brush a and segment 5a completes a circuit for notching relay NB which includes contacts X5, causing relay NB to operate, reopening contacts NB1 and reclosing contacts NB2. The opening of contacts NB1 stops selector motor 38 in the manner previously described and the closure of contacts NB2 recompletes a holding circuit for coil NB. At the completion of this notching movement, the system is in the same condition as when car A was standing at the third floor with the exception that brush carriages 33 and 34 have been advanced two notching distances, so that brush a is in engagement with segment 5a and brush a' is above segment 5a.

It is believed obvious that if the upward movement of car A is continued, notching inductor contacts L1 will again be momentarily opened when car A reaches a midpoint between the fifth and sixth floors and this operation will deenergize relay NA and cause notching motor 38 to advance brush carriages 33 and 34 one notching distance in the manner previously described. Since only a six floor installation is assumed, this notching movement brings brush carriages 33 and 34 to their limits of travel, in which position brush carriage 33 opens limit switch 39, interrupting the initially described circuit for up direction relay X. Contacts U7 in parallel with limit switch 39, however, maintain the circuit for relay W until car A stops at the upper terminal, at which time relay W resumes the deenergized position, reclosing contacts W1, W4 and W5 and reopening contacts W2 and W3 in Fig. 3.

The reclosure of contacts W1 completes the circuit for the coil of down direction relay X. The reopening of contacts W2 and W3 interrupts the previously prepared armature circuit for selector motor 38. Reclosure of contacts W4 and W5 connects relays NA and NB to brushes a and a' respectively.

Down direction relay X in operating opens contacts X1, which prevent completion of the circuit for up direction relay W; closes contacts X2 and X3, preparing an armature circuit for selector motor 38; and opens contacts X4 and X5 disconnecting relays NA and NB from brushes a' and a respectively. The system is now in condition for downward travel of the floor selector.

If car A is started downwardly, notching inductor contacts L1 are again momentarily opened when the car reaches a point midway between the fifth and sixth floors, deenergizing relay NA, the contacts of which function as previously described, to start selector motor 38. In this case, however, the armature circuit of motor 38 is reversed and brush carriage 33 is caused to move downwardly and brush carriage 34 is caused to move upwardly. At the completion of the notching movement, brush a is moved into engagement with segment 5a, recompleting the circuit for notching relay NA and notching motor 38 in the manner previously described. If car A continues downwardly, a corresponding notching operation is initiated by the opening of contacts L2 when car A reaches a point approximately midway between the fifth and fourth floors. At the termination of the latter notching movement, brush a' is in engagement with segment 5a and brush a is midway between segments 5a and 3a.

A corresponding notching movement is effected by the operation of contacts L1 when the car reaches a point approximately midway between the fourth and third floors, at the termination of which brush a engages segment 3a and brush a' occupies a position midway between segments 5a and 3a'.

It is believed obvious that during the downward movement of car A corresponding notching movements will occur at each notching point, each notching operation advancing brush carriages 33 and 34 one notching distance in the downward direction. As in the case of the arrival of car A at the upper terminal landing, the arrival thereof at the lower terminal landing, results in the deenergization of down direction relay X and the energization of up direction relay W, which functions as previously described to prepare circuits associated with the up travel of brush carriages 33 and 34.

It will be noted that car A may be reversed at any intermediate floor by momentarily opening the button marked "up" or the button marked "down" as the case may be, to produce the same results as the arrival of the car at a terminal landing.

It is thought to be obvious from the foregoing that the notching operation which occurs during upward travel at the notching point midway between the second and third floors brings brush carriages 33 and 34 into the same position occupied by these elements at the completion of the notching operation which occurs during down travel at the notching point between the third and fourth floors. Also, that as long as car A remains in the zone between any two notching points, brush carriages 33 and 34 occupy the same position regardless of whether car A entered such zone travelling upwardly or travelling downwardly.

The operation of the floor selector associated with car B is as described above in connection with car A.

*Starting of car A*

The circuits involved in this operation are shown in the upper parts of Figs. 3 and 4.

Assuming again that car A is standing at the third floor, that line conductors + and − are energized, and that the button marked "up" has been momentarily opened, up direction relay W is energized to condition the car for up travel, as previously described. The floor selector is also conditioned for up travel, as described. In addition, in connection with the operation now being described, selecting relays P and Q are both energized, (Fig. 4) the circuit for relay P including now closed contacts N3 and SS4 and the circuit for relay Q including now closed contacts M1, V5 and SS5. Relay P, in operating, closes self-holding contacts P1 and operates certain additional contacts described later; and relay Q, in operating, closes self-holding contacts Q1 and operates certain additional contacts described later.

As previously described, closure of button 45 energizes service relay SS, which, in operating, opens contacts SS4 and SS5. This operation is without effect, however, in view of the action of self-holding contacts P1 and Q1. As previously noted, service relay SS functions only at the time the car is initially placed in service.

Closure of the elevator car gate and hatchway door at the third floor closes the interlocks designated "doors and gate", completing a circuit for the coil of gate relay GG. Gate relay GG in operating, closes contact GG1 to prepare the starting circuits.

Closure of up contacts 16 of master switch MS completes a circuit for up reversing switch U and control relay M, which includes normally closed contacts G1 of stopping inductor switch G and contacts GG1 of gate relay GG. It also includes contacts S1 of transfer relay S, which remain closed except in the event of a transfer operation, described later. Upon completion of this circuit, up reversing switch U operates, closing contacts U1, U2, U3, U4, U5, U6, and U7, and opening contacts U8, all in Fig. 3; and control relay M operates, opening contacts M1, in Fig. 4. Contacts U6 complete a self-holding circuit for switch U and relay M.

Contacts U1 and U3 complete a circuit for field winding 14 of generator 11 causing the latter to apply a voltage of relatively low value to the armature of motor 10. Contacts U2 complete a circuit for the release coil of brake 12 and for the coil of auxiliary control relay MM. Upon the consequent release of the brake, motor 10 starts car A upwardly at low speed.

Contacts U5 complete a circuit for the coil of intermediate speed relay I which includes contacts F1 of the slow down inductor switch F. Upon completion of this circuit, relay I operates closing contacts I1 and opening contacts I2. Contacts I1 short circuit a section of resistance 50 in the circuit of field winding 14, accelerating motor 10 in the usual manner. Contacts I2 prevent completion of a circuit for stopping inductor switch G while car A is travelling at intermediate speed.

Contacts U4 prepare a circuit for high speed switch V which is subject to contacts C1 of voltage relay C. The latter contacts are delayed somewhat in closing to provide proper accelerating characteristics for the system. Contacts C1 close at a predetermined value of generator voltage completing a circuit for high speed switch V, which includes now closed contacts T1 of stopping relay T. Upon completion of this circuit, switch V operates, closing contacts V1, V2 and V4 and opening contacts V3 and V5. Closure of contacts V1 short circuits the second portion of resistance 51 in the circuit of field winding 14, and causes motor 10 to accelerate to its full operating speed. Contacts V2 complete a self-holding circuit for switch V. Contacts V3, in opening, prevent energization of the intermediate speed inductor switch F as long as the car travels at high speed. The opening of contacts V5 is without effect, but closure of contacts V4 completes a circuit for selecting relay N.

Control relay M, in operating, opens contact M1 in Fig. 4, deenergizing selecting relay Q. This action occurs at the time the car starts away from a floor.

Auxiliary control relay MM, in operating, closes contacts MM1 and MM2, the closure of contacts MM2 occurring slightly after the opening of contacts M1. Contacts MM1 prepare circuits for the coils of the inductor switches E, F and G. Contacts MM2 prepare a circuit for reenergizing selecting relay Q.

Selecting relay N, in operating, open contacts N1 and N3, and closes self-holding contacts N2. Contacts N1 have no immediate effect. Contacts N2 close a self-holding circuit for relay N, the purpose of which is described later. The opening of contacts N3 in Fig. 4 deenergizes selecting relay P, which resumes the deenergized position.

Upon completion of the above-described circuits, car A will continue upwardly at full speed until stopped in response to either a hall call or car call, or until a terminal landing is reached.

During the upward movement of car A the notching floor selector brush carriages 33 and 34 will be advanced a notching distance each time car A passes the notching point, in the manner previously described.

Referring to the circuits for selecting relays P and Q, it will be noted that brushes $b$, $b'$ and $b''$ are disposed to successively engage a row of segments, 1b, 2b, etc., of which there is one for each floor. At the completion of each notching movement, brush $b'$ is in engagement with one segment of this row, and brushes $b$ and $b''$ are each in engagement with a segment adjacent to such one segment. Between notching operations, therefore, no circuits are completed between brushes $b$, $b'$ and $b''$.

During the course of each notching operation, however, there is a short interval during which brushes $b'$ and $b''$ engage the same segment, and a second interval during which brushes $b$ and $b'$ engage the same segment. These periods of engagement prepare circuits for reenergizing selecting relays P and Q respectively. The circuit for selecting relay P, however, is subject to contacts T4 on stopping relay T, and consequently, cannot be completed except upon the approach of the car to a floor at which a call is registered. The circuit for relay Q is subject to contacts V5 on high speed relay V and cannot be recompleted as long as car A travels at high speed.

Relays P and Q function to determine which brush of a series of brushes associated with a particular row of segments is to be effective under different conditions of car speed, and the distance of the car from a floor for which a call is registered. In the illustrated embodiment, these selecting operations are required in connection with the circuits associated with stopping relay T, and also in connection with the circuits for the zone feed relays. The action of relays P and Q in connection with the control of relay T is as follows:

*Stopping of car A in response to car calls*

Referring to Fig. 4, the circuits for energizing stopping relay T are controlled by contacts on the up and down direction relays W and X respectively, contacts on the selecting relays P and Q, and through up and down rows of floor selector segments and cooperating brushes. The up row of segments includes a segment for each intermediate floor and the upper terminal floor designated 2d, 3d, etc., and the down row includes a segment for each intermediate floor and the lower terminal floor designated 1i, 2i, etc. Brushes $d$, $d'$ and $d''$ and $i$, $i'$ and $i''$ are arranged to successively engage the segments of the up and down rows, respectively.

Referring to Fig. 2, it will be noted that with car A standing at the third floor, or in the zone of the third floor, which as previously noted, extends from a point midway between the second and third floors, to a point midway between the third and fourth floors, brushes $d$, $d'$ and $d''$ are in engagement, respectively, with up segments 3d, 4d and 5d. Similarly, down brushes $i$, $i'$ and $i''$ are in engagement respectively with down segments 3i, 2i and 1i.

Each segment for an intermediate floor is connected to contacts on a corresponding floor relay 5UR, 4DR, etc., and may be selectively connected to a corresponding car button through contacts on up direction relay W and down direction relay X. Since it is assumed in the present example that the car is travelling upwardly, up direction relay W is energized so that contacts W8 and W11 are closed, and contacts W9 and W12 are open. Accordingly, button C5 is connected to up segment 5d and is disconnected from down segment 5i. Similarly, button C4 is connected to up segment 4d and is disconnected from segment 4i. Since down direction relay X is deenergized, contacts X8 through X11 thereof occupy the illustrated positions so that buttons C3 and C2 are connected respectively to up segments 3d and 2d, and are disconnected from down segments 3i and 2i. Accordingly, all of the car buttons are connected to up segments on the floor selector. Also, now closed contacts W10 of up direction relay W connect the coil of relay T to the circuits of up brushes d, d' and d", and corresponding open contacts X12 on down direction relay X disconnect relay T from the circuits of the down brushes i, etc. For these reasons, during up travel of car A, the car buttons are effective to energize only the up row of stopping segments. It will be noted that the stopping segments for the terminal floors are continuously energized so that a stopping action at these floors is obtained automatically, regardless of whether calls are registered therefor.

In the previously described starting operation, it was assumed that the car was started from the third floor, and no calls at either the fourth and fifth floors were assumed. At the time car A, travelling upwardly, reached the notching point between the third and fourth floors, however, brushes d, d' and d" were each advanced a notch, engaging segments 4d, 5d and 6d, respectively. Brushes i, i' and i" were also advanced a notch into engagement with segments 4i, 3i and 2i, respectively, although this operation is not of present interest.

Since selecting relays P and Q are both deenergized as described in connection with the starting operation, the engagement of brush d" and segment 6d completes a circuit for the coil of stopping relay T, including now closed contacts P2, Q2 and W10. Upon completion of this circuit relay T operates, closing contacts T2 and T4, and opening contacts T1 and T3. The opening of contacts T1 is without effect in view of the holding circuit for high speed switch V provided by contacts V2. Closure of contacts T2 prepares a circuit for the coils of high speed inductor switch E, and holding relay H. The opening of contacts T3 is without effect in view of the holding circuit provided for selecting relay N by contacts N2. This latter holding circuit becomes complete at the termination of the previously mentioned notching operation, at which time notching relay contacts NA3 and NB3 both become closed. Closure of contacts T4 prepares a holding circuit for relay T, which is without effect since notching relay contacts NA4 and NB4 are now both open.

No further action than is above described occurs until the car reaches the notching point between the fourth and fifth floors, at which time up brushes d, d' and d" are advanced another notch, bringing brush d' into engagement with segment 6d. As mentioned in connection with Fig. 2, throughout a portion of this notching movement, both brushes d' and d" engage segment 6d.

During a portion of this notching movement also, as previously described, brushes b' and b" engage a common segment, completing a circuit for the coil of selecting relay P, which includes now closed contacts T4 and W6. Upon completion of this circuit, relay P operates, completing a self-holding circuit through contacts P1, opening contacts P2 and closing contacts P3. The operation of contacts P2 and P3 disconnects brush d" from segment 6d, and connects brush d' to segment 6d. This transfer between brushes occurs during the period that both brushes d' and d" are in engagement with segment 6d, so that throughout the transfer, the circuit for stopping relay T is maintained. Maintenance of the circuit for relay T throughout this transition period is further insured by means of the holding circuit provided by contacts T5, since throughout each notching movement, either contacts NA4 or NB4 are closed. At the conclusion of the notching operation occurring between the fourth and fifth floors, therefore, stopping relay T is maintained energized through segment 6d and brush d'. Stated in another way the control of relay T is transferred from leading brush d" to lagging brush d'.

During the course of the notching operation between the fourth and fifth floors, also contacts NB3 are open, and interrupt the holding circuit for selecting relay N. Since contacts T3 are now open, relay N resumes the deenergized position, closing contacts N1 and N3 and opening contacts N2. The operation of contacts N2 and N3 has no immediate effect, but closure of contacts N1 completes a circuit for high speed inductor switch E and holding relay H.

Holding relay H in operating closes self-holding contacts H1. As previously mentioned, high speed inductor switch E does not operate immediately. When, however, car A brings inductor switch E into the region of inductor plate UE, associated with the sixth floor, inductor switch contacts E1 open, interrupting the circuit for high speed switch V. It is noted that the energization of the coil of high speed inductor switch E occurred when the car was approximately one and one-half floors in advance of the sixth floor, allowing, if required by the operating speed selected for the installation, approximately one and one-half floors for a slow-down operation. The system is applicable, of course, to installations operating at lower speeds, the only requirement being that at the time the high speed inductor switch is energized, in order to make a stop at a selected floor, the high speed inductor plate for the preceding floor shall have already been passed.

High speed switch V, upon being deenergized, opens contacts V1, V2 and V4, and recloses contacts V2 and V5. The opening of contacts V1 inserts resistor 51 in the circuit of field winding 14, decelerating the car in the usual manner. Contacts V2 and V4 have no immediate effect. Contacts V3 complete a circuit for intermediate speed inductor switch F. Contacts V5 prepare a circuit for selecting relay Q.

When car A brings intermediate switch F opposite a plate UF associated with the sixth floor, contacts F1 open, deenergizing intermediate speed switch I, which resumes the deenergized position, opening contacts I1 and reclosing contacts I2.

The opening of contacts I1 reinserts resistor 50 in the circuit of field winding 14, further decelerating the car to a low speed. Contacts I2 complete a circuit for the coil of stopping inductor switch G.

When car A reaches the notching point between the fifth and sixth floors, brushes d, d' and d" are each advanced one notch, bringing brush d into engagement with segment 6d. Throughout a portion of this movement also both brushes d and d' engage segments 6d.

Throughout a portion of this notching movement also brushes b and b' engage a common segment, completing a circuit for selecting relay Q, which includes now closed contacts MM2, V5 and W7.

Relay Q completes a self-holding circuit through contacts Q1, opens contacts Q2 and closes contacts Q3. Contacts Q2 and Q3 function to connect brush $d$ to relay T and disconnect brush $d'$ therefrom. This transfer between brushes $d$ and $d'$ occurs during the period that brushes $d$ and $d'$ both engage the same segment. Moreover, as previously noted, an additional holding circuit for relay T is provided during this period through contacts T5. Accordingly, relay T is maintained in the operated position throughout the transfer.

When car A brings stopping inductor switch G opposite a cooperating inductor plate UG, adjacent the sixth floor, contacts G1 are opened interrupting the circuit for up reversing switch U and control relay M. Up reversing switch U, upon being deenergized, opens contacts U1, U2, U3, U4, U5, U6, U7 and recloses contacts U8. The opening of contacts U1, U2 and U3 deenergizes field winding 14 and applies brake 12, stopping the car in the usual manner. The opening of contacts U2 also deenergizes auxiliary control relay MM, the opening of contacts MM1 of which interrupts the circuits for inductor switches E, F and G, and holding relay H. The opening of contacts MM2 is without effect, in view of the previous closure of contacts M1, which reclose in response to the deenergization of control relay M. The opening of contacts U4, U5 and U6 is without effect in view of the previous operation of inductor contacts E1, F1 and G1. The opening of contacts U7 interrupts the circuit for up direction relay W, since limit switch 39 is now open, as previously described. Closure of contacts U8 prepares a circuit for down direction relay X.

Upon being deenergized, up direction relay W resumes the deenergized position and contacts W1 through W12 thereof resume the illustrated positions. Closure of contacts W1 completes a circuit for down direction relay X. Contacts W2, W3, W4 and W5 function in connection with the notching floor selector circuits as previously described. The opening of contacts W6, and W7 has no effect, in view of the holding circuits for relays P and Q, provided by contacts P1 and Q1, respectively.

The operation of contacts W8, W9, W11, and W12 transfers the connections for car buttons C5 and C4, conditioning these buttons for controlling the down travel of the car. The re-opening of contacts W10 disconnects relay T from up brushes $d$, $d'$ and $d''$.

Down direction relay X, upon being energized, operates contacts X1 through X12. Contacts X1 serve as an interlock in the circuit of up direction relay W, and contacts X2 through X5 condition the floor selector for up travel in the manner previously described. Contacts X6 and X7 connect relays P and Q to brushes $b$, $b'$ and $b''$, respectively. Contacts X8 through X11, in operating, connect car buttons C3 and C2 to control down direction stops. Contacts X12 in closing connect relay T for control by down brushes $i$, $i'$ and $i''$.

It will be noted that while car A is at rest, conditioned to travel downwardly, relay T may be maintained energized through either brush $i$ and contacts Q4; brush $i'$ and contacts P4 and M3; or brush $i''$ and contacts M4 and M3, assuming either a car or hall call is registered for floors corresponding to the segments engaged by brushes $i$, $i'$ or $i''$. While conditioned to travel upwardly, similar energizing circuits are provided through brushes $d$ and $d'$, although not through leading brush $d''$. These energizing circuits are provided in connection with the transfer mechanism, described later. At the time car A starts away from a floor, contacts M2, M3 and M4 open, leaving the up and down brushes directly under the control of selecting relays P and Q, and direction relays W and X.

Car A may be started downwardly and accelerated to full speed by closing master switch contact 17 to energize down reversing switch D and control relay M. The remainder of the starting and accelerating operation is identical with that described in connection with up direction travel, with the exception that contacts D1 through D8 down reversing switch D function, instead of corresponding contacts on up reversing switch U. As in the case of starting car A in the up direction, selecting relays P and Q become deenergized in the course of the accelerating operation. The opening of contacts Q4 and P4 renders trailing brush $i$ and lagging brush $i'$ ineffective, respectively. Contacts P5 and Q5 in closing, render leading brush $i$ effective to control stopping relay T.

If no calls are registered for intermediate floors, car A will continue to the lower terminal, the floor selector carriages 33 and 34 being advanced one notch at each notching point. At the conclusion of the notching operation, which occurs when car A reaches the midpoint between the fourth and third floors, leading brush $i$ engages first floor stopping segment $1i$, energizing relay T through a circuit which includes contacts P5, Q5 and X12, all of which are closed as previously described. The remainder of the slowdown operation which results in bringing car A to rest at the first floor, is identical with that described in connection with the stop at the sixth floor with the following exceptions. Contacts E2, F2 and G2 of inductor switches E, F and G, respectively, function instead of contacts E1, F1 and G1 to sequentially interrupt the circuits for switches V, I and D and M. The energization of selecting relay P occurs through a circuit including contacts X7 and brushes $b$ and $b'$, instead of through a circuit including contacts W6 and brushes $b'$ and $b''$. Similarly, the circuit for selecting relay Q is completed through contacts X6 and brushes $b'$ and $b''$ instead of through contacts W7 and brushes $b$ and $b'$. Similarly to the case of up direction travel, the control of stopping relay T is sequentially transferred from leading brush $i''$ to lagging brush $i'$, and to trailing brush $i$, as car A approaches the first floor.

At the termination of the stopping operation at the first floor, down direction relay X is deenergized by opening of down reversing switch contacts D8, contacts X1 through X12 of which resume the illustrated positions. Up direction relay W is energized upon closure of down direction relay contacts X1, again establishing the same condition of the control system as when car A was standing at the third floor conditioned to travel upwardly, with the exception that the floor selector brush carriages are in the first floor positions, rather than the third floor positions.

Stops at intermediate floors registered while the car is three or more floors away therefrom, are in all respects the same as described in connection with the stops at terminal floors, just described. For example, assuming that car A is starting upwardly from the first floor and that no calls are registered at either the second or third floors, the acceleration thereof to full speed is as previously described. Assuming further that fifth floor car button C5 is closed, it is maintained in closed position by means of the associated retaining coil shown under the designation "car button coils" in Fig. 4.

When car A reaches the notching point between the second and third floors, floor selector brushes $d$, $d'$ and $d''$, and $i$, $i'$ and $i''$ are advanced to the positions illustrated in Fig. 4. Accordingly, a circuit is completed for stopping relay T, which includes contacts W8, P2, Q2 and W10, all of which are now closed. Upon being energized, relay T causes stopping of car A at the fifth floor in the manner previously described for the sixth floor stop. A corresponding stopping action may be obtained during down travel, in response to any car button operated while the car is three or more floors in advance of the corresponding floor.

As previously mentioned, any operated car buttons are automatically reset each time the car reaches or leaves a terminal landing, since under such conditions, there is a short interval during which both contacts W13 and X13 are both open. In the event of a reversal at intermediate floors, this occurs in response to the opening of the button marked up or the button marked down. At terminal floors it occurs as a result of the opening of limit switches 39 and 40 and reversing contacts U7 and D8.

The stopping action obtained when the car is less than three floors from the corresponding floor is as follows. Assuming again that car A is standing at the third floor conditioned to travel upwardly, and that fifth floor car button C5 is operated, it is retained in closed position in the manner previously described. If car A is now started upwardly by closure of master switch contact 16, up reserving switch U, speed switches I and V, and relays M and MM operate as previously described. As previously mentioned, contacts M1 deenergize relay Q. Contacts Q3 open, disconnecting brush $d$ and deenergizing stopping relay T. Contacts Q2 close in the circuits of brushes $d'$ and $d''$. Upon closure of contacts V4 in the accelerating operation, selecting relay N operates and contacts N3 thereof deenergize relay P. Contacts P3 disconnect brush $d'$ and connect brush $d''$, thereby recompleting a circuit for stopping relay T, which includes button C5, contacts W8, contacts Q2 and contacts W10, all of which are now closed. After completion of this circuit for relay T, the remainder of the stopping operation at the fifth floor is as previously described.

A corresponding action is obtained in the course of down travel, in response to a call registered while car A is at rest for a floor two floors in advance of car A.

The operation of the system in response to a call registered while car A is at rest, for the next succeeding floor is as follows. Assuming again that car A is standing at the third floor conditioned to travel upwardly, and that fourth floor car button C4 is closed, it is retained in closed position in the manner previously described. If master switch contacts 16 are again closed, car A is started upwardly through the action of up reversing switch U, intermediate switch I and control relays M and MM. In this case, however, high speed switch V is prevented from operation and the speed of car A limited to an intermediate value.

Contacts M1, in opening, deenergize relay Q in the manner previously described, at the time car A starts upwardly from the third floor. Contacts Q3, in opening, disconnect brush $d$, interrupting the circuit for relay T. Contacts Q2, in closing, however, recomplete a circuit for relay T since at this time, selecting relay P is energized and contacts P3 are closed. Relay T upon being energized, opens contacts T1, preventing completion of a circuit for high speed switch V, and opens contacts T3, preventing completion of a circuit for selecting relay N. Contacts T4, in conjunction with contacts N3, which remain closed, maintain a circuit for selecting relay P. Accordingly, although as in the previously described accelerating operations, selecting relay Q is deenergized, selecting relay P is maintained energized so that the slowdown operation for the fourth floor is initiated through lagging brush $d'$ and leading brush $d''$ remains ineffective.

The remainder of the acceleration of the car to intermediate speed is as previously described. Similarly, the stopping of the car from intermediate speed is as previously described, with the exception that slowdown is initiated by intermediate speed inductor switch F, instead of high speed inductor switch E. It is thought to be obvious that a corresponding action is obtained for one floor runs during downward travel.

The operation of car B is as described above in connection with car A.

Response to hall calls

The control apparatus involved in this operation is shown in Figs. 3, 4 and 6.

Referring to Fig. 6 and as previously mentioned, each of cars A and B is provided with a set of up and down push buttons individual to it located at the respective landings, and designated 5U, 5D, etc., B5U, B5D, etc., respectively. Floor relays, the operating coils of which are designated 5UR, 5DR, etc., B5UR, B5DR, etc., are associated, respectively, with the individual push buttons. Each floor relay responds directly to the associated push-button and upon being operated completes a self-holding circuit for itself, and so remains in operated condition until reset, as hereinafter described. For example, operation of button 5U energizes floor relay 5UR which, upon operation, closes contacts 5UR3 to complete a self-holding circuit and operates certain additional contacts described below. It will be noted that the self-holding circuits for the down floor relays 6DR, 5DR, etc., are controlled by contacts on transfer relays K and JJ, the corresponding circuits for car B being similarly controlled. These contacts have no effect except in cases of transfer operations described hereinafter. It will be observed that the hall buttons for both cars A and B are continuously operable so that as many calls may be registered for each car at any given time as may be desired.

Referring again to Fig. 4, each registered call prepares a circuit to effect the stopping of the car upon its approach to the corresponding floor. Contacts 5UR1, 4UR1, 5DR1, 4DR1, etc. of each of the floor relays are connected directly to corresponding up and down segments $5d$, $4d$, $5i$, $4i$. Accordingly, upon operation of any floor relay, the consequent stopping action is in all respects similar to the stopping operation obtained in response to the car button for a corresponding floor, and previously described.

Referring again to Fig. 6, each floor relay, upon operation, closes an additional contact such as 5UR2, 4UR2, etc., to prepare a circuit for the cancellation coil 5URC, 4URC etc., of the corresponding relay. These cancellation circuits are also controlled by floor selector brushes f and k and cooperating segments. As shown in Fig. 6, as well as in Fig. 2, up cancelling brush f cooperates with a row of up cancelling segments designated 1f, 2f, 3f and 5f, there being one segment for each intermediate floor and the lower terminal floor. Brush k cooperates with a corresponding row of down cancelling segments designated 2k, 3k, 4k and 6k, there being one segment for each intermediate floor and the upper terminal floor. As shown in Fig. 2, brushes f and k are in engagement with a particular segment while the car is in the zone for the corresponding floor, that is, while the car is in the region extending from the notching point below a particular floor to a notching point above a particular floor. Contacts GG2 of gate relay GG are open except when the car gate or a hatchway door is open so that the cancellation of calls does not occur except upon the opening of the car gate or a hatchway door. As described in connection with the response to car buttons, contacts W10 and X12 of the up and down direction relays W and X respectively prevent response of the car except to calls for the corresponding direction. Similarly, contacts W16 and X18 in Fig. 6 prevent resetting of calls except upon the arrival of the car at the corresponding floor traveling in the direction corresponding to the call.

A typical operating sequence is as follows: Assuming up bottom 5U is closed, operating coil 5UR of the fifth floor up relay is energized and closes contacts 5UR1, 5UR2 and 5UR3. Contacts 5UR1 prepare a stopping circuit in Fig. 4. Contacts 5UR3 complete a self-holding circuit in Fig. 6, and contacts 5UR2 prepare a resetting circuit, also in Fig. 6.

The stopping action resulting from the closure of contacts 5UR1 in Fig. 4 is as previously described in connection with a stop in response to the fifth floor car button C5. When car A reaches the notching point between the fourth and fifth floors, brushes f and k are notched into engagement with segments 5f and 5k, respectively. The action of brush k is without effect since contacts X18 are now open. The engagement of brush f and segment 5f further prepares a circuit for cancelling coil 5URC of the fifth floor up relay. Upon the opening of the car gate or the third floor hatchway door, the coil of gate relay GG is deenergized, as shown in Fig. 3, and contacts GG2 reclose in Fig. 6, energizing coil 5URC. As previously mentioned, this action restores the fifth floor up relay to the deenergized position, cancelling the fifth floor up call.

The response to down calls is the same as described for the fifth floor up call with the exception that down cancelling brush k functions instead of up cancelling brush f. Since the control systems for cars A and B are identical, the response of car B to its hall buttons is, of course, the same as described for car A.

As previously mentioned, it has been found in practice that when any car of a bank stops at a particular floor landing, all intending passengers at that floor who wish to go in the corresponding direction ordinarily board such car although they may have registered their calls on others of the cars. For this reason, the present invention is arranged so that stopping of any car at any floor cancels all calls registered for that floor and direction.

For example, assuming that fourth floor up calls have been registered for both cars A and B, operating coils 4UR and B4UR are both energized as previously described. The cancelling coils 4URC and B4URC for cars A and B, respectively, are connected in parallel through a conductor 60. Accordingly, upon completion of a resetting circuit for either floor relay a corresponding circuit is completed for the other floor relay. Contacts 4UR2 and B4UR2 prevent completion of these resetting circuits, however, unless the corresponding floor relays have been operated. The arrow head designated 61 indicates a connection which extends to a corresponding connection associated with any other car of the bank, as the arrangement is, of course, applicable to installations of more than two cars. As will be obvious, the other cancellation coils for cars A and B, respectively, are interconnected in the manner just described for the fourth floor coils 4URC and B4URC.

*Zoning relay and terminal selecting operation*

As previously mentioned, the circuits for the floor lanterns and indicating lights, shown in Fig. 7, are controlled by zoning mechanism which responds to the relative positions of the cars and divides the hatchways into operating zones, each car controlling all of the lanterns and indicating lights in its particular zone. The apparatus for controlling the circuits shown in Fig. 7 comprises the terminal selecting apparatus shown at the bottom of Fig. 6, the zone feeding relay circuits shown at the bottom of Fig. 4 and the common zoning relay circuits shown in the upper part of Fig. 5.

Referring particularly to the terminal selecting apparatus in Fig. 6, car A is provided with a terminal selecting relay TT and car B is provided with a terminal selecting relay BTT. An actuating circuit for relay TT is completed through brush c and segment 6c when car A, travelling upwardly, reaches the notching point immediately below the upper terminal floor and a corresponding circuit is completed through brush c and segment 1c when car A, travelling downwardly, reaches the notching point immediately above the lower terminal floor. Segments 6c and 1c are connected directly in parallel with corresponding segments B6c and B1c associated with car B. Selective resistors 71 and 72 are in series with both branches of these circuits respectively.

Assuming that car A reaches the lower terminal in advance of car B, relay TT is operated through the circuit including resistor 72, segment 1c, brush c, auxiliary resistor 73, coil TT, and contacts W17 which, as previously described, become closed as an incident to the arrival of car A at the first floor. Upon being operated, relay TT closes contacts TT1 and operates certain additional contacts described hereinafter. Contacts TT1 complete a self-holding circuit for relay TT. This self-holding circuit for relay TT remains complete until, in response to the arrival of car A at the upper terminal floor, contacts W14 open.

Contacts X19 close upon the arrival of car A at the upper terminal floor, recompleting a circuit for relay TT through segment 6c and brush c. If car A is the only car at the upper terminal floor, relay TT is again operated as previously described. If some other car is standing at the upper terminal floor, however, with its terminal relay, such as BTT for car B, operated, the drop through resistor 71 is such that relay TT is supplied with insufficient voltage to operate it. Relay TT accordingly remains in the deenergized position until such preceding car leaves the upper terminal floor, at which time it is again operated, as previously described.

The connections and apparatus for both cars A and B are the same. Similarly, where additional cars are employed, corresponding elements for all cars are connected in parallel as indicated by the arrow heads 74 and 75. With this arrangement, the first car into the terminal operates its terminal selecting relay and a succeeding car does not operate its terminal selecting relay until the departure of such first car.

In the event that more than one car is standing at a terminal floor at the time line conductors + and − are energized, the drop through the corresponding selective resistor 71 or 72 will be such that neither selecting relay is energized. Manually operable buttons 76 and B76 are provided to short circuit auxiliary resistors 73 and B73 and cause operation of the terminal selecting relay for the corresponding car under these conditions.

In the event that either car reverses its direction of travel at an intermediate floor, the reversal deenergizes the corresponding terminal selecting relay, through action of contacts W17 and X19, or corresponding contacts for car B. Since actuating circuits for relays TT and BTT are completed only at terminal floors, these relays accordingly remain deenergized until the corresponding car reaches a terminal floor.

Referring now to Fig. 7, it will be noted that contacts TT2 and BTT2 control the circuits for all of the floor lanterns and indicating lights of the corresponding car. Accordingly, assuming that both cars A and B are at the same terminal floor, no floor lanterns or indicating lights for the car last to arrive are illuminated until the departure of the car first to arrive.

Referring now to the lower part of Fig. 4, the operation of the zone feed relays is as follows: The up zone feed relays 2UY, 3UY, etc., for the intermediate floors are caused to respond successively to the advance of car A during up travel through cooperating segments 2e, 3e, etc., and cooperating brushes $e$, $e'$, $e''$, $e'''$ and $e''''$. Corresponding down zone feed relays 4DY, 3DY, etc., for intermediate floors are caused to respond successively to downward movement of car A through cooperating segments 3j, 4j, etc., and cooperating brushes $j$, $j'$, $j''$, $j'''$, $j''''$. First floor segments 1j and 1e are interconnected so that first floor zone feed relay 1UY operates upon the arrival of car A, during downward travel, at the notching point immediately above the first floor, and remains operated until car A reaches the same notching point during upward travel. Terminal floor segments 6j and 6e are similarly interconnected so that zone feed relay 6DY remains energized as long as car A remains in the zone of the sixth floor.

In Fig. 4, the brushes $e$, $e'$, etc., and $j$, $j'$, etc., are shown in the position occupied while car A is in the third floor notching zone. With car A at rest at the third floor, as previously described, selecting relays P and Q are both energized. Accordingly, contacts Q6 and Q9 are closed, contacts Q7 and Q8 are open, contacts P6 and P9 are closed and contacts P7 and P8 are open. Under these conditions, up brushes $e''$ and $e''''$ and down brushes $j''$ and $j''''$ are ineffective. If car A is conditioned to travel upwardly, contacts W14 are closed, and a circuit for up third floor zone feed relay 3UY is completed through segment 3e, brush e, resistor 55, contacts Q9, contacts W14, and contacts JJ1, which are closed under the conditions assumed. If car A is conditioned to travel downwardly, contacts W14 are open, and contacts X14 are closed, as previously described. Under these conditions, down third floor zone feed relay 3DY is energized through a circuit similar to the one just described.

It is seen, therefore, that while car A is standing at a particular floor, the up or down zone feed relay for that floor is energized, depending upon the direction in which car A is conditioned to travel.

If, as previously described, car A starts away from the third floor, both selecting relays P and Q become deenergized as an incident to the acceleration of car A to high speed. Contacts Q6 through Q9 and P6 through P9 resume the illustrated positions. Under these conditions, brushes $j$ and $j''$ and $e$ and $e''$ are ineffective, and brushes $j''''$ and $e''''$ are effective. Depending upon the direction in which car A departed from the third floor, either first floor zone feed relay 1UY or fifth floor up zone feed relay 5UY is energized, as determined by the action of contacts X14 and W14.

It is seen, therefore, that while car A is travelling at high speed, the zone feed relay, corresponding as to direction for the second floor in advance of the floor corresponding to the position of car A, is operated.

Assuming again that car A is standing at the third floor, and that a call is registered for the next floor in the direction in which car A is conditioned to travel. In this event, as previously described, if car A leaves the third floor, its speed is limited to an intermediate value in order to permit the stop at the adjacent floor. Under these conditions, selecting relay Q is deenergized but selecting relay P remains energized. Accordingly, brushes $j$ and $j''''$ and brushes $e$ and $e''''$ are ineffective and either brush $j''$ or $e''$ is effective, depending upon the condition of direction contacts X14 and W14. It is seen, therefore, that when car A departs from a particular floor in making a one floor run, the zone feed relay for the floor at which the car is standing is deenergized and the zone feed relay for the next succeeding floor corresponding as to direction, is energized.

As noted above with car A travelling at high speed, the zone feed relay for the second floor in advance of the car's position is operated. Assuming, for example, that car A is in the second floor zone travelling upwardly, the fourth floor zone relay 4UY is energized. When car A reaches the notching point between the second and third floors, the floor selector advances one notch, moving leading brush $e''''$ from segment 4e to segment 5e. This energizes fifth floor zone feed relay 5UY and deenergizes fourth floor zone relay 4UY. If a call is registered for the fifth floor, as previously described, relay T becomes energized at the time of this notching operation. As also previously described, relay T prepares circuits which, upon the arrival of car A at the next notching point, that is, between the third and fourth floors, energizes selecting relay P; and also establishes circuits which result in stopping the car. The energization of relay P opens contacts P8 and closes contacts P9. This action renders brush e'''' ineffective and renders brush e'' effective and, as previously noted, occurs during the course of the notching operation. At the termination of the notching operation between the third and fourth floors, brush e'''' is in engagement with segment 6e, but being ineffective, does not operate zoning relay 6UY. Brush e'' is in engagement with segment 5e and maintains zone feed relay 5UY energized.

When car A reaches the notching point between the fourth and fifth floors, relay Q is energized, as previously described, and contacts Q9 close and contacts Q8 open, rendering brush e effective and brush e'' ineffective. This action also occurs during the course of the notching operation which brings brush e into engagement with segment 5e. Accordingly, up zone feed relay 5UY remains energized. It is thought to be obvious that a corresponding action occurs during down travel in the event car A approaches a floor at which a call is registered.

From the foregoing, it is seen that when a car approaches a floor at which a call is registered, that car does not operate any zone feed relays in advance of such floor until after the stop at that floor is completed.

The normally closed and normally open contacts of both selecting relays P and Q overlap somewhat, both when the corresponding relay is energized and when it is deenergized. That is, when relay Q is energized, contacts Q6 close before contacts Q7 open and when relay Q is deenergized, contacts Q7 reclose before contacts Q6 reopen. The remaining similarly related contacts of both relays P and Q operate in the same way. For this reason, when, as an incident to each starting or slowdown operation, relays P and Q change positions as previously described, a circuit for one zone feed relay is completed before the circuit for another zone feed relay is interrupted.

At each notching point in the travel of car A, all of the brushes j, j'', etc., and e, e'', etc., advance one notching distance, through the previously described operation of the notching floor selector. During each such notching movement, a brush, such as brush e'''', disengages a particular segment and a short time thereafter, engages the next succeeding segment. During a portion of this movement, in the illustrated embodiment, brush e'''', does not engage either of the two segments in question. During the period, however, that brush e'''' does not engage either segment, auxiliary brush e''' engages the segment just disengaged by brush e'''', and remains in engagement therewith until the latter brush engages the next succeeding segment. With this arrangement, a particular zone feed relay remains energized until the next succeeding zone feed relay is energized, so that at all times at least one zone feed relay corresponding to car A is energized.

An auxiliary resistor 80 is associated with auxiliary brush e''' so that this brush, while effective to maintain a previously operated zone feed relay, is ineffective to initially actuate any of the zone feed relays.

A corresponding auxiliary brush e' and resistor 81 is associated with brush e''. Corresponding auxiliary brushes j''' and j', and auxiliary resistors 82 and 83 are associated respectively with brush j'''' and j''.

Referring now to the upper part of Fig. 5, it is noted that contacts 6DY1, 5DY1, 5UY1, 4UY1 on each of the zone feed relays individual to car A are connected in parallel with the corresponding contacts on the zone feed relays individual to car B, and jointly control zoning relays 6DZ, 5DZ, 5UZ, 4UZ, etc.

With this arrangement, it will be observed that at any time during the travel of the cars, in addition to each car operating one of its own zone feed relays, corresponding to its position, each car also operates one of the common zoning relays also corresponding to its position.

*Operation of floor lanterns and indicating lights*

Referring to Fig. 7, each floor lantern and the corresponding indicating light for car A are connected in parallel in a group of related circuits controlled jointly by contacts such as 5UY2, 4UY2, 6DY2, etc., of the zone feed relays, and contacts 5DZ1, 5UZ1, etc., of the common zoning relay. The circuits for the floor lanterns are additionally subject to contacts such as 5UR4, 4UR4, 6DR4, 5DR4, etc., of the corresponding floor relays. An auxiliary circuit for each floor lantern is also provided through brushes g and l and associated selector segments 1g, 1l, etc., for a purpose mentioned later. The circuits for car B are correspondingly controlled by contacts such as B5UY2, etc., of the zone feed relays for car B, and additional contacts 5UZ2, etc., of the common zoning relays.

Assuming that cars A and B are both at the lower terminal floor, and that car A was the first to arrive, terminal selecting relay TT is operated as previously described and contacts TT2 in Fig. 7 are closed. Corresponding contacts BTT2 associated with car B are open as previously described, so that no floor lantern or indicating light circuits for car B are completed.

Since car A is standing at the first floor, zone feed relay 1UY and common zoning relay 1UZ are both operated as previously described. Contacts 1UY2 complete circuits which light all of the up indicating lights 1ULL, 2ULL, 3ULL, 4ULL and 5ULL as well as all of the down indicating lights 6DLL, 5DLL, 4DLL, 3DLL and 2DLL, for car A. The circuit for light 1ULL extends from + through light 1ULL and through contacts 1UY2 to —. The circuits for the remaining indicating lamps include one or more contacts on the common zoning relays. For example, the circuit for the light 3ULL includes contacts 3UZ1 and 2UZ1, in addition to contacts 1UY2. The circuit for light 4DLL includes contacts 4DZ1, 5DZ1, 6DZ1, 5UZ1, 4UZ1, 3UZ1 and 2UZ1 in addition to contacts 1UY2. As mentioned, the indicating lamps 1ULL, etc., are preferably located adjacent the hall buttons for the corresponding floors and all intending passengers are advised by these lights that car A is the preferred car, that is, the car which may be expected to reach the corresponding floors first. Any calls registered on the hall buttons associated with car A operate corresponding floor relays as described in connection with Fig. 6. These floor relays prepare circuits through contacts 5UR1, etc., (Fig. 4) which result in the stopping of car A at the corresponding floors;

and through contacts 5UR4, etc. (Fig. 7) complete a circuit to light the corresponding floor lantern at the time the hall button is operated. Accordingly, under the conditions assumed, operation of any hall button corresponding to car A results in the immediate illumination of the corresponding floor lantern. Under the conditions assumed, operation of any hall button corresponding to car B operates the corresponding floor relay as shown in Fig. 6, preparing stopping circuits in Fig. 4 and closing corresponding contacts such as B5UR4 in Fig. 7. The latter action is without effect, however, since terminal selecting relay contacts BTT2 are open.

Assuming that car A leaves the first floor, first floor zone feed relay IUY is deenergized and in the event that car A accelerates to full speed, third floor zone feed relay 3UY is energized as previously described.

With car B remaining at the lower terminal floor terminal floor relay BTT is operated and closes contacts BTT2 in Fig. 7, to condition the floor lantern and indicating lantern circuits of car B. Also with car B at the first floor zone feed relay BIUY is energized.

Zone feed relay 3UY energizes common zoning relay 3UZ, and zone feed relay BIUY energizes common zoning relay IUZ. These relays divide the hatchways into signal or "call" zones, that is, zones throughout which a particular car is the preferred car. Under the conditions just assumed, the zone for car A includes up "calls" for the third floor and all floors above it, and down calls for all floors; and the zone for car B includes up calls for the first and second floors. As before, all of the indicating lights in the zone for car A are lighted, and in addition, the indicating lights individual to car B in the zone for car B are lighted. The circuits for the indicating lights individual to car A are as follows:

Contacts 3UY2 energize indicating lamp 3ULL directly. Circuits for indicating lamps 4ULL and 5ULL and the down indicating lamps 6DLL, 5DLL, 4DLL, 3DLL and 2DLL include one or more contacts on the common zoning relays, such as 5UZI, 6DZI, etc. Common zoning relay contacts IUZI and 3UZI, being open, prevent completion of circuits for indicating lamps 2ULL and IULL.

With respect to car B, the circuit for indicating lamp BIULL is completed directly through contacts BIUY2. The circuit for lamp B2ULL includes an additional contact 2UZ2. Contacts 3UZI and IUZI, being open, contacts BIUY2 are ineffective to complete circuits for any of the indicating lamps for car B except lamps BIULL and B2ULL.

When car A reaches the notching point between the first and second floors, zoning relay 4UY is energized and zoning relay 3UY is deenergized in the manner previously described. Upon being energized, zoning relay 4UY closes contacts 4UYI in Fig. 5, energizing common zoning relay 4UZ, and closes contacts 4UY2, in Fig. 7, to maintain the circuits for all of the indicating lamps previously lighted for car A except indicating lamp 3ULL. Lamp 3ULL is extinguished by the opening of contacts 3UY2, which results from the deenergization of the third floor zone 3UY, and by the opening of common zoning relay contacts 4UZI.

Indicating lamp B3ULL for car B is lighted at the time that lamp 3ULL is extinguished, the circuit therefore being completed by closure of common zoning relay contacts 3UZ2 which results from the deenergization of common zoning relay 3UZ.

When car A passes the notching point between the second and third floor, the zone feed and common zoning relay circuits are again modified, extinguishing lamp 4ULL for car A and lighting indicating lamp B4ULL for car B, the circuits being similar to those just described.

It is seen therefore that as car A moves upwardly in the hatchway the up "calls" are successively excluded from the zone for car A and included in the zone for car B.

It will be obvious that when car A reaches the upper terminal, assuming car B is still at the lower terminal, the zone for car A includes only down "calls" and the zone for car B includes all of the up "calls". Similarly, if car A starts downwardly from the upper terminal, down "call" are successively excluded from the zone of car A and included in the zone of car B.

After car A reaches the lower terminal with car B still standing at such terminal, terminal selecting relay TT for car A will be deenergized as an incident to the arrival of car A, as previously described. Selective resistor 72 will, under these conditions, prevent reenergization of relay TT. Accordingly, contacts TT2 in Fig. 7 remain open, preventing illumination of any indicating lamp or floor lantern for car A. Under these conditions all of the indicating lamps for car B will be lighted. Also, operation of any hall buttons associated with car B will cause an immediate lantern operation in a manner previously described. Operation of hall buttons individual to car A, while effective to register a call which will result in the stopping of the car A in the manner previously described, will not light corresponding floor lanterns.

Assuming that prior to the return of car A to the lower terminal, car B leaves such lower terminal, the zone feed relays for car B operate as described in connection with the departure of car A from the lower terminal. As car B advances up the hatchway, up calls are successively excluded from the zone of car B and included in the zone of car A.

As described in connection with the zone feed relays, when a car is at rest at a floor the zone feed relay for the corresponding floor and direction is operated. If the car leaves such floor to make a one floor run, the zone feed relay for the next succeeding floor is operated at the time the car starts. If, in leaving a particular floor, a car accelerates to full speed, the zone feed relay corresponding to a floor two floors in advance of the position of the car is energized. The limits of the zone assigned a particular car, therefore, are dependent upon whether the car is at rest, is making a one floor run, or is travelling at high speed. In any event, however, the zone of a particular car extends from the position determined by the operated zone feed relay to the floor corresponding to an operated zone feed relay of the next car travelling, or conditioned to travel, in the same direction. In the absence of such next car travelling in the same direction the zone for the first car extends to the corresponding terminal and back to the floor corresponding to an operated zone feed relay for the nearest car travelling in the opposite direction.

At any given time, all of the up and down indicating lights for a particular car in the zone for that car are illuminated. Operation of any up or down hall button in the zone for a particular car also immediately lights the floor lantern for the corresponding floor and direction.

As previously described, the respective floor relays after having been operated, remain in operated condition until the corresponding direction, unless canceled by another of the cars, similarly, the floor lanterns remain lighted as long as the corresponding floor relay is operated.

As previously mentioned, it has been found in practice that when any car stops at a floor, all intending passengers at that floor who wish to travel in the corresponding direction ordinarily board such car even though they have registered their calls on others of the cars. For this reason, it is desirable that the stopping of a car at a floor shall light the floor lantern for that floor and corresponding as to direction, independently of the zoning system. For this reason, each floor lantern is provided with an auxiliary circuit controlled by brushes $g$ and $l$ for the up and down directions, respectively.

As shown in Fig. 7, brush $g$ cooperates with segments $1g$, $2g$, $3g$, etc., associated respectively with the up lanterns. Brush $l$ cooperates with corresponding segments $6l$, $5l$, etc., associated respectively with the down lanterns. As shown in Fig. 2, brushes $g$ and $l$ engage a particular segment while the car is in the notching zone associated with the corresponding floor. As previously mentioned, when the car gate or a hatchway door gate is opened relay GG (Fig. 3) is deenergized and contacts GG3 (Fig. 7) reclose. This completes an auxiliary lantern circuit for the corresponding floor and direction, as determined by direction contacts W18 and X23. It will be noted that this circuit is independent of the zoning system so that the stopping of a car at a floor results in the lighting of a lantern for that floor corresponding to the direction of travel for the car. The auxiliary lantern circuit is, however, subject to contacts TT2 of terminal selecting relay TT. Corresponding auxiliary lantern circuits are provided for car B.

*Bypassing calls from leading car to selected following car*

As previously mentioned, bypass buttons 21 and 22, Fig. 5, are provided in car A for operation in the event that it is desired to transfer calls registered on car A, to car B, or to a third car C, respectively. Similar buttons 23 and 24 are provided in car B for operation in the event that it is desired to transfer calls registered on car B to a following car A or C, respectively. As also mentioned, the apparatus responsive to buttons 21 and 22 and 23 and 24 functions, in the illustrated embodiment, only during down travel of the cars.

For the purpose of this description it is assumed that both cars A and B are conditioned to travel downwardly, that car A is standing at, for example, the second floor, and that car B is standing at, for example, the fifth floor. Since both cars are conditioned to travel downwardly, down direction contacts X15 and X16, associated with car A, and contacts BX15 and BX16, associated with car B, are closed. (Fig. 5).

Closure of by-pass button 21 in car A operates transfer relays J, K, JJ and KK associated with car A and transfer relay BK associated with car B, the circuits for these relays being shown in the lower part of Fig. 5. The circuits for relays J and BK are completed directly through contacts on button 21. The circuit for relay K is completed through contacts J2. The circuit for relay KK includes now closed contacts J5, S5 and two terminal switches 90 and 91 which are closed except while the car is at a terminal floor. These circuits remain complete only as long as button 21 is held closed.

The circuit for relay JJ is completed through now closed contacts K2, J4, S4 and terminal switches 90 and 91. Upon operation, relay JJ completes a self-holding circuit which remains complete until the car reaches a terminal floor. Relay JJ also opens contacts JJ2 in the circuit of lamp 28 associated with car B for a purpose mentioned later. The opening of contacts JJ1 in Fig. 4 prevents completion of any zone feed relay circuits for car A, and deenergizes any previously energized zone feed relays for car A. From the previous description, it will be obvious that this action excludes car A from the zoning or signal system, extinguishing any indicating lights previously lighted for car A in Fig. 7, as well as any floor lanterns previously illuminated for car A. The opening of contacts JJ4 in Fig. 6 prepares the circuits for cancelling any calls registered on car A.

Relay KK in operating opens contacts KK1 and closes contacts KK2, the latter contacts being without effect in connection with the present operation. The opening of contacts KK1 prevents completion of a circuit for stopping relay T. As long as these contacts remain closed accordingly, car A does not respond to registered car or hall calls.

Relay K upon being energized operates contacts K1 through K8. The action of contacts K1 has no effect and the effect of contact K2 has been previously mentioned in connection with the energization of relay JJ. Referring to Fig. 6, contacts K3 and K4 are connected in parallel with contacts JJ4. The exchange of positions of contacts K3 and K4 in response to closure of button 21 is without effect since, at the time of this exchange, contacts JJ4 are still closed. Contacts K5, K6, K7 and K8 are included in interconnections between the down floor relay circuits of cars A and B. These interconnections also include corresponding contacts on relay BK.

As illustrated, these interconnections are employed only in connection with the down floor relays for intermediate floors, since there is no necessity of transferring a terminal call. Upon closure of contacts K5 through K8 and BK5 through BK8 any previously energized down floor relays associated with car A complete circuits for corresponding down floor relays for car B. Upon completion of the latter circuits, the floor relays for car B complete self holding circuits, and cause the stopping of car B at the corresponding floors in the manner previously described in connection with the operation of car A. For example, assuming that down hall calls for the fifth, and fourth floors are registered on car A at the time of the transfer operation, relays 5DR and 4DR are energized, and are maintained through contacts 5DR2 and 4DR2, respectively. Upon operation of relays K and BK as mentioned circuits are completed for relays B5DR and B4DR as follows, respectively: From + through contacts,
K3, 5DR3, K5, BK5, coil B5DR, and
from + through contacts
K3, 4DR2, K6, BK6 and coil B4DR to —.
Since no calls are assumed to be registered for the third and second floors, closure of contacts K7 and K8, and BK7 and BK8 has no effect. Upon completion of the above two circuits, relays B5DR and B4DR close self-holding contacts B5DR2 and B4DR2, respectively, maintaining these relays in operated condition until the stopping of car B at the corresponding floors.

If button 21 is now released, transfer relays J, K and KK associated with car A and transfer relay BK associated with car B are deenergized and the contacts thereof resume the illustrated positions. The opening of contacts KK2 has no effect but the closure of contacts KK1, Fig. 4, renders stopping relay T again effective to respond to any previously registered car calls for car A. The action of the contacts of transfer relay J has no effect. The deenergization of relay BK restores contacts BK1 through BK8 thereof to the illustrated positions. This action has no effect, since the circuits associated with contacts BK1 and BK2 are interrupted elsewhere; and the circuits initially prepared through contacts BK5 and BK8 are either interrupted elsewhere or are maintained through self-holding contacts on the down floor relays associated with car B. There is a short interval throughout which contacts BK3 and BK4 are both in the open position. This action, however, has no effect since contacts BJJ4 are closed.

Upon being deenergized, relay K restores contacts K1 through K8 to the illustrated positions. The action of contacts K1, K2, K5, K6, K7 and K8 is without effect since the associated circuits are interrupted elsewhere. There is a short interval throughout which contacts K3 and K4 are both open. These contacts jointly with contacts JJ4 control the self holding circuits for all of the down floor relays associated with car A. Since contacts JJ4 are now open, the exchange of position between contacts K3 and K4 interrupts the floor relay self holding circuits, deenergizing any operated floor relay associated with car A.

To summarize, the closure of button 21 excludes car A from the signal zoning system (contacts JJ1), prevents response by car A to either car or hall calls (contacts KK1) and transfers all down hall calls registered on car A to car B (relays K and BK). The release of button 21 renders car A again effective to respond to car calls and any subsequently registered hall calls, (contacts KK1) and cancels the previously transferred calls by resetting the corresponding floor relays for car A (relay K).

In this operation, the only relay associated with car B involved is relay BK. Similarly in the event of operation of by-pass button 22, to by-pass calls from car A to a third car C, transfer relays J, K, JJ and KK for car A operate through circuits similar to those previously described and in addition relay CK for car C is operated. Since as previously mentioned the control systems for all cars of the bank are identical, it is thought to be obvious that relay CK for car C cooperates with relay K for car A, in the manner described with reference to relays K and BK, to transfer registered hall calls from car A to car C. In this connection, it is noted that the connections in Fig. 6 for effecting the transfer of calls include arrow heads such as 94. These arrow heads extend to contacts on relay CK for car C, which are related to the floor relay circuits for car C in the manner that contacts such as BK5 are related to the corresponding circuits for car B.

It is thought to be obvious that a transfer of calls from car B to car A or to car C may be effected by operation of buttons 23 and 24 associated with car B in the manner described in connection with the operation of buttons 21 and 22 associated with car A. For example, closure of button 23 operates transfer relays BJ, BK, BJJ and BKK for car B and relay K for car A. The action of these relays is as described in connection with the previously described transfer of calls from car A to car B.

Down direction contacts X15 and X16 and BX15 and BX16 prevent response of the transfer relays J and K and BJ and BK except during downward travel of the corresponding cars. Accordingly, by-pass buttons 21 and 22 and 23 and 24 and corresponding buttons for car C are effective only during downward travel of the cars.

The transfer action is, however, independent of the relative positions of the cars. Preferably, however, calls will be transferred from a leading car to the nearest following car, and signals 25 and 26 for car A and 28 and 29 for car B are provided in the associated cars to serve as an indication as to which car of the bank is nearest. Corresponding lights would, of course, be provided in additional cars. Lamps 25 through 29 are continuously illuminated except in the event that the corresponding relay JJ, BJJ or CJJ for the corresponding car is operated. These relays are deenergized as long as a car is in the zoning system and are deenergized at the time a car is excluded from the zoning system since it is undesirable to transfer calls to a car which for any reason is not in the regular zoning system. The circuits for signal lamps 25 through 29 are suitable for use in a system in which the cars are regularly dispatched from the terminal in a regular order such as car A first, car B second and car C third. In such a system, assuming all cars are travelling in the proper rotation and all cars are included in the zoning system, both lights 25 and 26 will be lighted in car A showing cars B and C are both in condition to receive calls. Lamps 28 and 29 will both be lighted in car B showing that cars A and C are in condition to receive calls. Since car B is normally the nearest car to car A, transfers of calls from car A are preferably effected by operating button 21. If for any reason car B is out of the zoning system, lamp 25 is not lighted, showing that transfers of calls from car A should be made to car C by operating button 22. The action of lamps 28 and 29 is similar to the action of lamps 25 and 26.

As noted, transfer relay JJ, Fig. 5, remains operated until car A reaches the lower terminal, at which time switch 90 or 91 is opened, and as an incident to the stopping of the car, control relay contacts M2 open, deenergizing relay JJ and restoring the zone feed circuits for car A.

*Transferring calls from leading car to following car by operation of transfer buttons in following car*

As previously mentioned, transfer buttons 20 and B20 for cars A and B are provided for operation in the event that a downwardly moving car approaches within a predetermined distance of a leading car travelling in the same direction. The apparatus which responds to the relative positions of the cars for initiating this operation as well as initiating a somewhat similar operation during upward travel of the cars is shown in Fig. 8.

Referring to Fig. 8, the floor selector for car A is provided with a row of down segments of which there is one for each intermediate floor designated 2m, 3m, 4m and 5m and a corresponding row of up segments designated 2h, 3h, 4h and 5h, respectively. Car B is provided with corresponding rows of segments designated B5m, etc. and B5h, etc. Corresponding segments for cars A and B are electrically connected by means of conductors such as 96. Four down brushes m, m', m" and m''' cooperate with the down segments for car A and three up brushes h, h' and h" cooperate with the up brushes for car A. Corresponding brushes are provided for car B.

As shown in Fig. 2 as well as in Fig. 8, brushes m and h engage related segments for a particular floor while the car is in the zone of that floor. Brushes m, m' m" and m''' are each spaced apart one notching distance, brushes m', m" and m''' being in advance of brush m. Brushes h' and h" are similarly spaced ahead of brush h, brush h" being the leading brush. The brushes for car B are correspondingly located. With this arrangement, further assuming car A to be the leading car, brush m and brushes Bm''' engage corresponding segments when car B is three notching distances or three floors behind the position of car A.

Car A is provided with transfer relays R and S, relay R being disposed to respond when car A is the leading car and relay S being disposed to respond when car A is the following car during downward travel. During upward travel, relay R responds in the event that car A is the following car and relay S responds in the event that car A is the leading car. Car B is provided with corresponding transfer relays BR and BS.

Assuming that car A is the leading car, and that car B approaches within a predetermined distance of it, relays R and BS are operated. This action lights the light in car B indicating that a transfer should be made. If this indication is responded to by operation of the transfer button in car B, relays R and BS jointly with the transfer button exclude car A from the zoning system and transfer all of the calls registered on car A to car B. If this signal is not responded to, car B is stopped and cannot be restarted again until either the transfer button is operated or until car A restarts.

The operations involved are as follows: Assuming that car A is standing at, for example, the second floor and that car B is moving downwardly, a circuit for relays R and BS is completed at the time car B completes the notching operation which occurs between the fifth and sixth floors, by the engagement of brush m, segment 3m and the engagement of segment B3m and brush Bm''', the circuits being as follows:

—, coil R, contacts S6, JJ6, X21, 13, brush m, segment 3m, segment B3m, brush Bm''', contact BLL2, BX23, BJJ7, contacts BR3, coil BS +.
Contacts 13 are closed since it is assumed that car A is at rest. It being assumed that all cars have the same operating speed, it will be apparent that circumstances requiring a transfer of the kind in question may be expected to arise only in the event the leading car is at rest. The transfer circuits therefore, preferably are responsive only when the leading car is at rest. Contacts BLL2 are closed since it is assumed that no calls are registered for car B at any floors intervening between the position of car B and car A, in which event relay BLL is energized. The circuit for this relay is shown at the top of Fig. 8 and includes contacts BT6 and BJJ5. Contacts BT6 open only in the event that car B approaches a floor at which a call is registered. Contacts BJJ7 are closed except when car B is excluded from the zoning system.

Relay BS in operating closes contacts BS3 in Fig. 5, completing a circuit for transfer light 30. This circuit includes transfer contacts BJ3, up direction contacts BW15 and service relay contacts BSS6, all of which are now closed. Signal lamp 30 located in car B accordingly lights indicating that a transfer operation should occur. Relay BS also completes a circuit through contacts BS2 in Fig. 4 for stopping relay BT which includes now closed transfer contacts BJ1. Upon completion of this circuit, relay BT operates and prepares circuit which unless modified results in the stopping of car B at the third floor. This stopping action is in all respects the same as the stopping action which would occur in response to registration of a third floor call. It will be recalled from the previous description that registration of a call results in the operation of stopping relay T when the car enters the notching zone of a floor two floors in advance of the floor corresponding to the registered call.

Operation of relay BT in response to closure of contacts BS2 interrupts the previously described circuit in Fig. 8 for relay BLL, contacts BLL2 of which accordingly reopen. This action has no effect, however, since now closed contacts BS10 are connected in parallel therewith. When car B reaches the notching point between the fourth and fifth floors, brush Bm" is notched into engagement with segment B3m. During a portion of this notching movement, both brushes Bm''' and Bm" engage segment B3m. At the completion of the notching operation, the circuit for relays BS and R is maintained through brush Bm".

At the time car B reaches the notching point between the fourth and third floors, another notching operation occurs at the terminal of which the circuit for relays R and BS is maintained through brush Bm'.

It is seen, therefore, that the circuit for relay S, after having been initially completed by the approach of the two cars, is maintained complete until the stopping of the following car. When car B stops at the third floor, the holding circuit for down reversing switch BD (Fig. 3) is interrupted and an actuating circuit therefor cannot be recompleted because of the now open condition of contacts BS1. Accordingly, car B is prevented from restarting as long as transfer relay BS is operated.

It is thought to be obvious that if, at the time car B reaches the notching point between the fifth and sixth floors, a call had been registered for car B for either the fifth or the fourth floor, that stopping relay BT would have been energized prior to the arrival of car B at such notching point. If the call had been registered for car B or the third floor, relay BT would have been energized when car B reached such notching point. If relay BT is energized at the time car B reaches the notching point between the fifth and sixth floors, relay BLL is deenergized in Fig. 8 and contacts BLL1 and BLL2 thereof are open. Accordingly, actuating circuits for relays R and BS cannot be completed through either brushes B$m'''$ or B$m''$.

Assuming, for example, that car B is stopped at the third floor in response to a call, the engagement of brush B$m'$ with segment B$2m$ completes an actuating circuit for relays R and BS and relay BS functions as previously indicated to light signal 30 in Fig. 6 and prevent the restarting of car B (contacts BS1, Fig. 3) unless transfer button B20 is operated or unless car A starts, opening contacts I3 to thereby interrupt the circuit for relays R and BS. If car A is stopped at the fourth or fifth floors in response to a call, either brush B$m''$ or B$m'''$ engages segment B$2m$. Under these conditions, relay BT (Fig. 4) may be energized through circuits in parallel through B$i$, B$i'$ and B$i''$, assuming any car or hall button relay contact for car B, corresponding to a floor between cars A and B is closed. These circuits also include contacts BM3 and BM4, closed since car B is at rest. Referring again to Fig. 8, contacts BT6 deenergized relay BLL, contacts BLL1 and BLL2 of which are accordingly open. No circuit is therefor completed for relays R and BS, and car B may be started downwardly from the fourth or fifth floor. As soon as car B starts from, for example, the fourth floor, contacts BM3 and BM4 open. Assuming a third floor call exists however, relay BT is maintained energized through brush B$i'$, segment B$3i'$ and contacts BP5. Accordingly, relay BT causes car B to stop at the third floor in the manner previously described. If no such additional circuit is provided, relay BT becomes deenergized when car B restarts and recloses contacts BT6, energizing relay BLL. Contacts BLL1 and BLL2 accordingly close, completing a circuit for relays R and BS as previously described. As also previously described, this action reenergizes relay BT in Fig. 4 and causes car B to stop at the third floor.

It is seen therefore that failure to respond to signal 30 in car B causes car B to come to rest at the floor immediately behind the position of car A and prevents the restarting of car B from such preceding floor until car A restarts, opening contacts I3.

Assuming, however, in connection with any of the preceding examples, that transfer button B20 is closed in response to the indication given by transfer light 30, car A is excluded from the zoning system and its calls are transferred to car B as follows:

Closure of button B20 energizes transfer relays BJ and BK for car B and energizes transfer relays K and JJ for car A. The circuit for relay BJ is completed directly through button B20. The circuit for transfer relay BK is completed through now closed contacts BJ2. The circuit for transfer relay K extends as follows: + contacts BJ2, BK1, R1, coil K, contacts X16—.

The circuit for transfer relay JJ is completed by the closure of transfer relay contacts K2 and R2 and also includes hatchway limit switches 90 and 91.

As described in connection with the by-passing of calls by operation of button 21, transfer relay JJ excludes car A from the zoning system, through the opening of contacts JJ1 in Fig. 4, which deenergizes the zone feed relay circuits. Accordingly, any indicating lights or floor lanterns previously lighted for car A are extinguished in Fig. 6. As also described in connection with the operations resulting from closure of button 21, transfer relays K and BK cooperate in the circuits shown in Fig. 6 to transfer any registered down hall calls from car A to car B.

Transfer relay JJ also opens contacts JJ6 and JJ7 in Fig. 8, contacts JJ6 interrupt the circuits for transfer relay R which accordingly resumes the illustrated position. Relay BS is maintained energized through a self-holding circuit including contacts BS9 and BJ6. The operation of the contacts of transfer relay R has no effect since the circuit initially completed through contacts R1 for transfer relay K (Fig. 5) is now maintained through contacts K1. The circuit initially completed through contacts R2 in Fig. 5 is now maintained through contacts JJ3. Reclosure of contacts R3 is without effect in Fig. 8 since no brush circuit is completed for relay S.

Relay J, in operating, opens contacts BJ1 in Fig. 4, interrupting the previously described auxiliary circuit for stopping relay BT, rendering the stopping of car B responsive only to calls registered for car B.

Upon the release of button B20, transfer relays BJ and BK for car B and transfer relay K for car A are deenergized. Transfer relay JJ for car A, however, remains energized, excluding car A from the zoning system until the lower terminal is reached.

Upon deenergization, the contacts of relay BJ resume the illustrated position. Reclosure of contacts BJ1 in Fig. 4 has no effect since contacts BS2 reopen at substantially the same time. The opening of contacts BJ2 in Fig. 5 deenergizes transfer relay BK. Reclosure of contacts BJ3, Fig. 5, has no effect since contacts BS3 open at substantially the same time. The opening of contacts BJ4 in Fig. 5 has no effect since the related circuit is interrupted elsewhere. The opening of contacts BJ5 prevents completion of a circuit for transfer relay BKK in response to the closure of contacts BS5 which occurs at substantially the same time. The opening of contacts BJ6 in Fig. 8 interrupts the previously mentioned holding circuit for relay BS restoring relay BS to the deenergized condition.

The operation of the contacts of transfer relay BS at the time this relay is deenergized is as follows: The reclosure of contacts BS1 in Fig. 3 conditions the starting circuits for car B. The reopening of contacts BS2 in Fig. 4 has no effect since transfer contacts BJ1 are now open. The opening of contacts BS3 in Fig. 5 extinguishes transfer light 30. Reclosure of contacts BS4 in Fig. 5 has no effect since the associated circuit is interrupted elsewhere. Reclosure of contacts BS6 in Fig. 8 has no effect since the circuit for relay BR is interrupted elsewhere. The reopening of contacts BS7 through BS10 in Fig. 8 is similarly without effect.

Deenergization of transfer relay BK has no effect. Deenergization of relay K, however, cancels any registered down hall calls on car A in the manner described in connection with the operations which result from closure of button 21.

At the conclusion of the transfer operation therefor, calls previously registered on car A are transferred to car B and are cancelled from car A. Car A is excluded from the zoning system, extinguishing the indicating lights individual to car A and also extinguishing any previously lighted down hall lanterns for car A. The zone for car B now includes all of the floors previously in the zone for car A and the corresponding indicating lights are lighted for car B, also any hall lanterns corresponding to the transfer calls are lighted for car B. It is thought to be obvious that a corresponding action occurs in the event that car B is the leading car and car A is the following car. In this instance, lamp 27 in car A is lighted upon the approach of the cars. Stopping of car A or the transfer of calls from car B to car A is as described above. Since the transfer apparatus for both cars is the same, it is thought to be obvious also that the arrangement disclosed in the present embodiment is applicable to systems employing more than two cars, since, as previously mentioned, the control system for all cars are identical. In Fig. 8 it is noted that the conductors, such as 96, which interconnect corresponding segments for cars A and B include circuits terminating in arrow heads. These circuits extend to corresponding segments on all other cars of the bank.

In connection with the previous examples, it is noted that when a leading brush for one car as B$m'''$ and a trailing brush for a leading car, as $m$, engage corresponding segments, the only circuits directly completed are for relays R and BS. If the cars approach more closely, brushes such as $m'$ and B$m'''$ may engage corresponding segments. The latter engagement does not energize both relays S and BS however, since both terminals of such a circuit are connected to +. Also, although in such event a circuit may be momentarily completed including both relays R and S for car A, the coil of relay S is immediately deenergized. It is noted that relays R and S interlocked through contacts S6 and R3 respectively. Under the conditions assumed, however, a positive energizing circuit for relay R is provided (which includes relay BS, as previously described). The only circuit for relay S under such conditions includes its own contacts S6. Upon relay R becoming energized, contacts R3 open, positively preventing energization of relay S. Relays BR and BS are similarly related.

The action resulting during up car travel when a following car approaches within a predetermined distance of a leading car is as follows. Assuming that car B is standing at the fourth floor conditioned to travel upwardly and that car A is in the notching zone of the second floor, either traveling upwardly or conditioned to travel upwardly, brush $h''$ is in engagement with segment $4h$ and brush B$h$ is in engagement with segment B$4h$. Since both cars A and B are conditioned to travel upwardly, direction contacts W19, W20 and W21 and BW19, BW20 and BW21 for car B are closed. Assuming further that no calls for car A are registered for either the second, third or fourth floors, relay LL (Fig. 8) for car A is energized and contacts LL3 in the same figure are closed. Accordingly, a circuit is completed for relays R and BS as follows:

— coil R, contacts S6, JJ6, W19, LL3, brush $h''$, segment $4h$, segment B$4h$, brush B$h$, contacts BW21, BJJ6, contacts BR3, coil BS, +.

Upon completion of this circuit, transfer relay R operates closing contacts R1 and R2 and opening contacts R3. The closure of contacts R1 and opening of contacts R3 has no effect, since the associated circuits are interrupted elsewhere. Closure of contacts R2, however, completes a circuit for transfer relay JJ associated with car A in Fig. 5 as follows:

+ coil JJ, contacts X17, R2, limit switches 90 and 91, —.

Relay JJ, upon operation, excludes car A from the zoning system in the manner previously described, extinguishing any indicating lights and floor lanterns previously lighted for car A. Relay JJ, through contacts JJ3, completes a self-holding circuit which remains complete until car A stops at the upper terminal, at which time the limit switch 90 or 91 opens and as an incident to the stopping operation, control relay contacts M2 open.

The operation of transfer relay BS for car B in this instance is without effect. Contacts BS1 and BS2 in Figs. 3 and 4 are concerned with the stopping and starting circuits, respectively, but it is assumed in this example that car B is at rest. As mentioned, transfer operations of the kind in question, as well as those just described are ordinarily occasioned only in the event that the leading car is at rest. Closure of contacts BS3 in Fig. 5 is without effect since up direction contacts BW15 are open. Closure of contacts BS4 and opening of contacts BS5 in Fig. 5 is without effect since the associated circuits are interrupted elsewhere. The action of contacts BS6 through BS10 in Fig. 8 is without effect since the associated circuits are interrupted elsewhere.

If, however, under the conditions assumed, with car B at the fourth floor and car A at the second floor, a call for car A exists at either the third or the fourth floors, stopping relay T is energized (Fig. 4), as previously described, and relay LL is deenergized (Fig. 8). Under these conditions, contacts LL3 are open so that no circuit is completed through brush $h''$. If, however, car A proceeds to the third floor with car B remaining at the fourth floor, the circuits previously traced for relays R and BS are completed through contacts W20 by the engagement of brush $h'$ with segment $4h$. The remainder of the transfer operation occurring under these conditions is as described above.

It is seen, therefore, that during upward travel of the cars a too close approach of two cars, while excluding one car from the zoning system, does not result in the transfer of registered calls. As noted elsewhere, this arrangement is preferable since during up travel of the cars the principal stops are made to discharge passengers rather than to receive passengers.

It is thought to be obvious from the foregoing that if car A is the leading car and that car B is the overtaking car a corresponding operation of transfer relays S and BR occurs in response to which car B is excluded from the zoning system. Also, as noted in connection with down travel, the illustrated arrangement is also applicable to systems of more than two cars, the corresponding segments for all cars being interconnected as by arrowheads 98 in Fig. 8.

We claim as our invention:
1. A system for operating a plurality of elevator cars past a floor comprising a passenger operated control for said floor individual to each of said cars for registering calls for the corresponding car; transfer means; and means re- sponsive to an operation of said transfer means to transfer a call registered for one of said cars to another of said cars, said last named means being effective regardless of the position of said cars with respect to said floors at the time said transfer means is operated.

2. A system for operating a plurality of elevators past a floor comprising a passenger operated control for said floor individual to each of said cars; relay means individual to each of said controls and operably responsive to operation of the corresponding control; transfer means and mechanism responsive to operation of said transfer means for resetting an operated relay means for one of said cars and actuating a corresponding relay means for another of said cars.

3. A system for operating a plurality of elevators past a floor comprising passenger operated means for said floor for registering calls for said cars; relay means individual to each of said cars for storing calls for the corresponding cars; transfer means; and means responsive to operation of said transfer means for rendering said relay means for one of said cars responsive to the operated condition of said relay means for another of said cars.

4. A system for operating a plurality of elevators past a floor comprising passenger operated means for said floor for registering calls for said cars; relay means individual to each of said cars for storing calls for the corresponding cars; transfer means; and means responsive to operation of said transfer means for rendering said relay means for one of said cars responsive to the operated condition of said relay means for another of said cars and for resetting said last mentioned relay means.

5. A system for operating a plurality of elevators past a floor comprising passenger operated means for said floor for registering calls for said cars; relay means individual to each of said cars for storing calls for the corresponding cars; transfer means; and means responsive to operation of the said transfer means for causing completion of a circuit for said relay means for one of said cars, said circuit being subject to the operated condition of the said relay means for another of said cars.

6. A system for operating a plurality of elevators past a floor comprising passenger operated means for said floor for registering calls for said cars; relay means individual to each of said cars for storing calls for the corresponding cars; transfer means for each of said cars; and means responsive to operation of the said transfer means for one of said cars for causing completion of a circuit for said relay means for another of said cars, said last named means comprising means for interconnecting the said relay means for said one car and said other car.

7. A system for operating a plurality of elevators comprising means for registering calls for the cars; relay means individual to each of said cars for storing calls for the corresponding car; transfer means; and means, including means controlled in accordance with the relative positions of said cars, responsive to an operation of said transfer means to render a relay means for one of said cars responsive to a corresponding operated relay means for another of said cars, to thereby transfer a call from said another car to said one car.

8. A system for operating a plurality of elevators comprising means for registering calls for the cars; relay means individual to each of said cars for storing calls for the corresponding car; transfer means; and means, including means controlled in accordance with the relative positions of said cars, responsive to an operation of said transfer means to render a relay means for a certain car responsive to a corresponding operated relay means for a car in advance of said certain car to thereby transfer a call from said advance car to said certain car.

9. A system for operating a plurality of elevator cars past a plurality of floors comprising passenger operated call means for each of said floors individual to each of said cars; relay means individual to each of said call means and responsive thereto for storing calls; transfer means; and means responsive to an operation of said transfer means for transferring all calls stored on the said relay means for one of said cars to the corresponding said relay means for another of said cars.

10. A system for operating a plurality of elevator cars past a plurality of floors comprising passenger operated means for each of said floors for registering calls for said cars; relay means individual to each of said cars for storing calls for the corresponding cars; transfer means; and means responsive to an operation of said transfer means for rendering the said relay means for one of said cars responsive to the said relay means for another of said cars, to thereby operate any of said relay means for said one car corresponding as to floors to operated relay means for said another car.

11. A system for operating a plurality of elevator cars comprising means for registering calls for the respective cars and for storing said calls; and means for transferring registered calls from the registering means for one of said cars to the registering means of another of said cars, said last named means comprising means controlled in accordance with the distance between said cars.

12. A system for operating a plurality of elevator cars comprising means for registering calls for the respective cars and for storing said calls; a signal; a transfer means; and means including means controlled in accordance with the relative positions of said cars for operating said signal and for rendering said transfer means effective to transfer a registered call from the registering means of one of said cars to the registering means of another of said cars.

13. A system for operating a plurality of elevators comprising means for registering calls for the respective cars and for storing said calls; a signal; a transfer means; and means, including means responsive to the approach of one of said cars within a predetermined distance of another of said cars, for operating said signal and for rendering said transfer device effective to transfer a registered call from the registering means of said another of said cars to the registering means of said one of said cars.

14. A system for operating a plurality of elevator cars past a plurality of floors comprising means for registering calls for the respective cars and floors; transfer means for each of said cars individual to each of the others of said cars; and means responsive to operation of any of said transfer means to transfer all calls from the car for which the transfer means is operated to the car to which the operated transfer means is individual.

15. A system for operating a plurality of elevator cars past a plurality of floors comprising passenger operated controls for said floors for registering calls for the corresponding floors; relay means individual to each of said cars for each of said controls and operably responsive to the corresponding controls; transfer means for each of said cars individual to each of the others of said cars; and means responsive to operation of the said transfer means for any one of said cars to operate all relay means for the car to which the operated transfer means is individual corresponding to operated relay means for said one car.

16. A system for operating a plurality of elevator cars past a plurality of floors comprising passenger operated controls for said floors for registering calls for the corresponding floors; relay means individual to each of said cars corresponding to each of said controls and operably responsive to the corresponding controls; transfer means for each of said cars individual to each of the others of said cars; and means responsive to operation of the said transfer means for any one of said cars to render the relay means for the car to which the operated transfer means is operated responsive to corresponding operated relay means for said one car, to thereby transfer calls from said one car to another of said cars.

17. A system for operating an elevator car comprising a current responsive element; selector mechanism comprising a stationary element and a plurality of movable elements; means controlled by car movement for moving said movable elements successively into engagement with said stationary element; means comprising circuit connections responsive to engagement of said stationary element by one of said movable elements for actuating said current responsive element; and means comprising circuit connections effective upon engagement of said stationary element by another of said movable elements for maintaining said current responsive element in actuated condition but ineffective to initially actuate it.

18. A system for operating an elevator car comprising a current responsive element; selector mechanism comprising a stationary element and a plurality of movable elements; means controlled by car movement for moving said movable elements successively into engagement with said stationary element; means comprising circuit connections responsive to engagement of said stationary element by one of said movable elements for actuating said current responsive element; and means comprising circuit connections effective upon engagement of said stationary element by another of said movable elements for maintaining said current responsive element in actuated condition, said last named means also comprising resistance means to prevent initial actuation of said current responsive element by said last named engagement.

19. A system for operating an elevator car comprising a series of current responsive devices; floor selector mechanism comprising a corresponding series of stationary elements, a plurality of movable elements each disposed to successively engage said stationary elements; means responsive to each engagement by one of said movable elements for actuating the corresponding device, means for maintaining a particular device in actuated condition until after actuation of the next succeeding device in said series comprising means responsive to engagement of the corresponding stationary element by another of said movable elements; and means associated with said another of said movable elements for rendering it ineffective to initially actuate said devices.

20. A system for operating a plurality of elevator cars past a plurality of floors comprising actuable call registering means for each of said floors individual to each of said cars; passenger operated means for each of said floors for actuating the call registering means for corresponding floors; resetting means for each of said call registering means; and means controlled by each of said cars for operating the resetting means for the call registering means associated with the others of said cars.

21. A system for operating a plurality of elevator cars past a plurality of floors comprising actuable call registering means for each of said floors individual to each of said cars; resetting means for each of said call registering means; and means including circuit connections between resetting means for corresponding floors responsive to the approach of any of said cars to a floor for causing said resetting means to reset all actuated ones of said call registering means corresponding to said approached floor.

22. A system for operating a plurality of elevator cars in a plurality of hatchways past a plurality of floors, one car in each hatchway, comprising means for stopping each of said cars at said floors; and means responsive to the approach of a following car within a predetermined distance of a leading car for stopping said following car.

23. A system for operating a plurality of elevator cars past a plurality of floors, comprising control means for each of said floors and means responsive thereto for stopping said cars at the corresponding floors; and additional means for stopping each of said cars comprising means responsive to the approach of a following car within a predetermined distance of a leading car for stopping said following car.

24. A system for operating a plurality of elevator cars past a plurality of floors comprising control means for each of said floors and means responsive thereto for stopping said cars at the corresponding floors; additional means responsive to the approach of a following car within a predetermined distance of a leading car for stopping said following car; and means controlled by said control means for determining said distance.

25. A system for operating a plurality of elevator cars in a plurality of hatchways past a plurality of floors, one car in each hatchway, comprising means for starting each of said cars and for stopping each of said cars at said floors; and means responsive to the approach of a following car within a predetermined distance of a leading car for preventing actuation of the starting means for such following car.

26. A system for operating a plurality of elevator cars comprising a series of relay means; means controlled by movements of said cars for actuating said series of relay means; and means rendered effective upon the approach of one car within a predetermined distance of another of said cars for rendering one of the last two cars mentioned ineffective to actuate said relay means.

27. A system for operating a plurality of elevator cars past a plurality of floors comprising a series of relay means corresponding respectively to said floors; means responsive to movements of said cars for successively actuating said relay means; and means responsive to the approach of one of said cars within a predetermined distance of another of said cars for rendering one of the last two cars mentioned ineffective to actuate said relay means.

HAROLD W. WILLIAMS.
CHARLES F. CARNEY.
RICHARD W. JONES.